United States Patent
Seward

(10) Patent No.: US 9,235,038 B1
(45) Date of Patent: Jan. 12, 2016

(54) TUBE LENS WITH LONG FRONT TUBE LENGTH WITHIN OPTICAL SYSTEM FOR DIGITAL PATHOLOGY

(76) Inventor: George H. Seward, Boston, MA (US)

(*) Notice: Subject to any disclaimer, the term of this patent is extended or adjusted under 35 U.S.C. 154(b) by 525 days.

(21) Appl. No.: 13/565,071

(22) Filed: Aug. 2, 2012

(51) Int. Cl.
G02B 21/00 (2006.01)
G02B 23/00 (2006.01)
G02B 9/12 (2006.01)

(52) U.S. Cl.
CPC *G02B 21/00* (2013.01); *G02B 9/12* (2013.01); *G02B 23/00* (2013.01)

(58) Field of Classification Search
None
See application file for complete search history.

(56) References Cited

U.S. PATENT DOCUMENTS

| | | | |
|---|---|---|---|
| 3,421,807 A | 1/1969 | Nothnagle | |
| 3,687,523 A * | 8/1972 | Schlegel et al. | 359/782 |
| 3,709,582 A * | 1/1973 | Walker | 359/733 |
| 3,804,506 A | 4/1974 | Fletcher | |
| 3,994,570 A | 11/1976 | Sussman | |
| 4,017,159 A | 4/1977 | Sussman | |
| 4,195,903 A | 4/1980 | Kawese et al. | |
| 4,262,989 A | 4/1981 | Waters | |
| 4,486,069 A * | 12/1984 | Neil et al. | 359/353 |
| 4,673,973 A | 6/1987 | Ledley | |
| 5,657,158 A * | 8/1997 | Baumann et al. | 359/363 |
| 5,699,196 A | 12/1997 | Misawa | |
| 5,731,905 A | 3/1998 | Imaizumi | |
| 5,739,957 A | 4/1998 | Konishi | |
| 5,742,439 A * | 4/1998 | Schuster | 359/749 |
| 5,790,313 A | 8/1998 | Kanai | |
| 7,245,425 B2 | 7/2007 | Miyashita | |
| 7,808,724 B2 | 10/2010 | Seward | |
| 2006/0018030 A1 * | 1/2006 | Wartmann et al. | 359/656 |
| 2007/0091454 A1 * | 4/2007 | Wartmann | 359/656 |

FOREIGN PATENT DOCUMENTS

DE 4107070 A1 * 9/1992

OTHER PUBLICATIONS

George H Seward, Optical Design of Microscopes, (2010) SPIE Press, Bellingham, WA. "Basic Microscope Concepts", pp. 7-12.
George H Seward, Optical Design of Microscopes, (2010) SPIE Press, Bellingham, WA. "Stops", pp. 18-19.
George H Seward, Optical Design of Microscopes, (2010) SPIE Press, Bellingham, WA. "Aberrations", pp. 27-32.
George H Seward, Optical Design of Microscopes, (2010) SPIE Press, Bellingham, WA. "Ocular lenses", pp. 139-145.

(Continued)

*Primary Examiner* — Arnel C Lavarias
(74) *Attorney, Agent, or Firm* — Thomas P. O'Connell; O'Connell Law Firm

(57) ABSTRACT

A tube lens includes a singlet and a doublet with a long front tube length between a lens stop and the tube lens. The front tube length is 1.0 to 1.5 times an effective focal length of the tube lens. The front tube length provides sufficient space for an optical platform, a folding mirror, and a telescope. The telescope rotates between a 2× mode with front and back doublets and a 1× mode with a clear aperture. The field angle of the tube lens is 4.0 degrees. Specific glass types correct the lateral color in a system for digital pathology with a white LED and a color CCD sensor. The system for digital pathology further includes an objective lens with a numerical aperture at 0.50-0.55, and a Kohler illumination system with a numerical aperture of critical illumination at 0.75-0.85 times the numerical aperture of the objective lens.

19 Claims, 12 Drawing Sheets

(56) References Cited

OTHER PUBLICATIONS

George H Seward, Optical Design of Microscopes, (2010) SPIE Press, Bellingham, WA. "Composition and spectra of Materials", pp. 183-194.
Kodak KAI-08050 Image Sensor, "Fig. 5 Color quantum efficiency," Kodak, Rochester NY (2010).
CBT-90 White LED Data Sheet, "Typical Spectrum", p. 7, Luminus Devices, Burlington, MA (2009).
Bautista Abe, Yamaguchi, Yagi and Ohyama, "Digital staining of pathological tissue specimens using spectral transmittance," Fig. 3 Transmittance spectra of HE-stained tissue, Proc. of SPIE vol. 5747, 1892-1903 (2005).
George H Seward, Optical Design of Microscopes, (2010) SPIE Press, Bellingham, WA. "Refractive Index", pp. 36-39.
Edward M. Nelson, "Critical Microscopy," Royal Microscopy Society, pp. 282-289 (1910).
George H Seward, Optical Design of Microscopes, (2010) SPIE Press, Bellingham, WA. "Coherence", pp. 199-201.
George H Seward, Optical Design of Microscopes, (2010) SPIE Press, Bellingham, WA. "Objective lens formats", p. 113.
Chuck Hawks, "Common Telescope Eyepiece Designs," www.chuckhawks.com/common_eyepiece_designs.htm.
August Kohler, "A new system of illumination for photomicrographic purposes," Proc. Royal Microsc. Soc. 28(4), pp. 181-185 (1993). Translated from Zeitschrift fur wissenschaftl. Mikroskopie, vol. 10, 433-440, 1893.
George H Seward, Optical Design of Microscopes, (2010) SPIE Press, Bellingham, WA. "Kohler illumination", p. 96-98.
Schott, Material Safety data sheet, N-KZFS11, (2005).
Schott, Material Safety data sheet, N-KZFS5, (2009).
Schott, Material Safety data sheet, N-SF6, (2005).
Schott, Material Safety data sheet, N-SK5, (2005).
Schott, Optical Glass Data Sheets, (2009). index data of all glass types including calcium fluoride.

\* cited by examiner

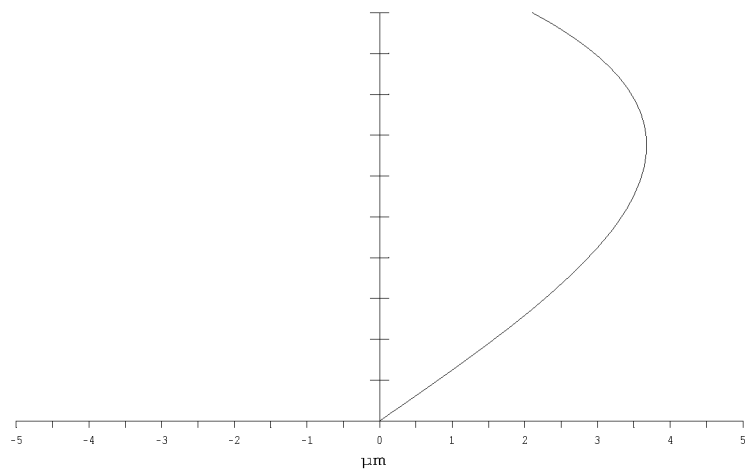
FIG. 8C
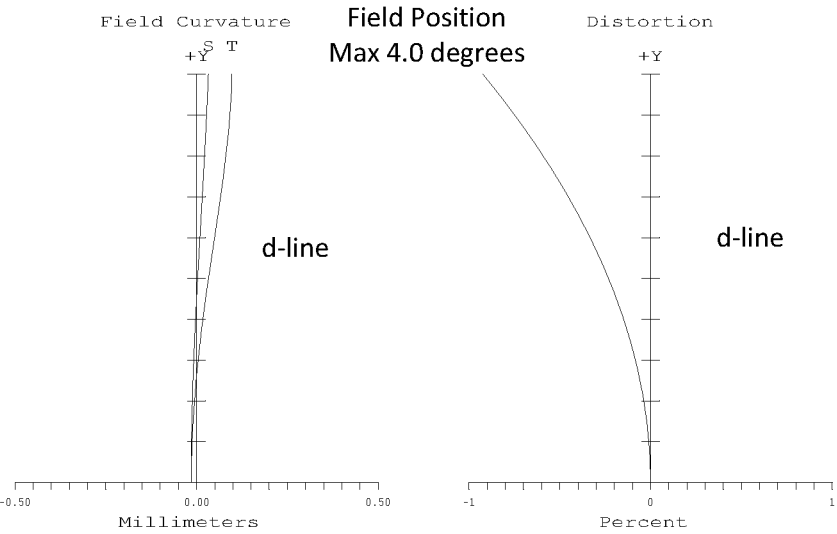
FIG. 8D
FIG. 8E

TUBE LENS WITH LONG FRONT TUBE LENGTH WITHIN OPTICAL SYSTEM FOR DIGITAL PATHOLOGY

FIELD OF THE INVENTION

The invention relates generally to digital pathology. Tissue stained with haemotoxilyn and eosin display prominent features in both red and blue spectra. Consequently, correction of color from red through blue is essential. Digital images must be optically correct throughout the spatial extent of the image. Thus, lateral color must be corrected throughout the entire image area. Sampling of the image by a pixel array should not create overlap of replicated Fourier spectra. Consequently, the magnification must be properly matched to the pixel size, magnification, and objective NA. The instrument should operate on a bench top. Thus, a folded optical path is beneficial.

Other applications of the tube lens are numerous, including, by way of example, cytology and hematology. Moreover, the tube lens has application beyond clinical tests, as it can be applied to any color digital imaging system wherein an objective lens requires a tube lens with a long front tube length.

BACKGROUND OF THE INVENTION

Haemotoxilyn and Eosin: Two of the most common tissue stains in pathology are haemotoxilyn and eosin. FIG. 1 displays the spectral transmission of tissue components stained with haemotoxilyn and eosin. The data of FIG. 1 is from the following article: Bautista, Abe, Yamaguchi, Yagi and Ohyama, "Digital staining of pathological tissue specimens using spectral transmittance," Proc. of SPIE Vol. 5747, 1892-1903 (2005).

Color Human Vision: Color vision in humans is typically described with a small set of spectral lines. The relevant spectral lines for the invention disclosed herein are as follow: g (436 nm), F (486 nm), e (555 nm), d (588 nm), and C (656 nm). The relative sensitivities of human vision at these lines are roughly: 7% at g, 24% at F, 100% at e, 68% at d, and 5% at C.

Human vision has poor spatial resolution at blue wavelengths. The fovea of the retina contains very few blue cones while the smaller foveola contains none. Human vision is largely based upon the red and green cones. These cones are commonly designated by wavelength as short (blue), middle (green) and long (red).

In a typical optical design for human vision, the F (486 nm), d (588 nm), and C (656 nm) spectral lines are specified. These three lines include a small portion of the blue range (440-490 nm). The g (436 nm) line is frequently ignored due to lack of blue sensitivity and blue resolution in human vision.

Color Machine Vision: Color machine vision is defined by the spectrum of the source and sensitivity of the detector. FIG. 2 displays the relative color sensitivity of the combination of a white LED and a color CCD. The LED is a CBT-90 by Luminus Devices, Inc. of Billerica, Mass., USA. The CCD is a KAI-08050 by the Eastman Kodak Company of Rochester, N.Y., USA.

A CCD sensor has large sensitivity at both the g and F lines. The quantum efficiencies of the color KAI-08050 sensor are: 38% at the g line, 45% at the F line, 20% at the d line, and 30% at the C line. The blue channel is more sensitive than the green or red.

A typical white LED comprises a blue gallium-nitride LED with phosphor coating. The emission spectrum comprises a peak at 450 nm from the LED, and broad phosphorescence from 450 nm to 700 nm.

The typical dyes of pathology are haemotoxilyn and eosin. The typical dyes of pathology create images with strong components at the g and F lines.

Correction of the g-line in film or CCD sensors requires the use of special glass. A combination of long crown and short-flint is common in objective lenses for both photography and microscopy.

There are two common formats of color vision by CCD sensors. A first format of color vision employs three CCD sensors and two beamsplitters. Consistent orientation of the images to the CCDs requires precise alignment of optical hardware, which is difficult and expensive. A shifted or rotated image requires interpolation for conversion to the correct location and angle. The sampling rate is defined by the width of a single pixel. A second format of color vision employs a Bayer pixel which comprises 1 blue pixel, 2 green pixels, and 1 red pixel. The image sampling rate of a Bayer is defined by the width of 2 pixels.

Glass Types: The refractive index of glass is defined by dipole current. A dipole comprises positive and negative charge with finite separation. The electric field of a dipole counters the external field of the electromagnetic wave. The opposing electric field of the dipole drives the total electric field back to zero faster than outside of the glass. Thus, the dipole current shortens the spatial wavelength. The effects of dipole current upon wavelength are represented by refractive index.

The growth in refractive index within a wavelength range is described by dispersion. The Abbe number defines dispersion as $$v_d = \frac{n_d - 1}{n_F - n_C},$$

wherein n specifies the refractive index according to spectral lines. Partial dispersion defines the growth in refractive index of a first range as a fraction of growth in refractive index of a second range. An example of partial dispersion is $$P_{gF} = \frac{n_g - n_F}{n_F - n_C}.$$

The normal partial dispersion of glass types is defined by Schott North America, Inc. of Elmsford, N.Y., USA (hereinafter "Schott") as $$P_{gFn} = +(0.6438) - (0.001682)v_d.$$

The relative partial dispersion is defined by a departure from the normal partial dispersion as below.

$$\Delta P_{gF} = P_{gF} - P_{gFn}$$

A crown glass employs tightly bound electrons with a resonant frequency in the near ultraviolet range. Consequently, a crown glass displays a refractive index that grows faster at shorter wavelengths. A crown glass displays a normal dispersion with nearly zero relative partial dispersion. Examples of crown glass are borosilicate and fused silica. A long crown employs tightly bound electrons with a resonant frequency in the deep ultraviolet. Consequently, the refractive index is smaller than crown glass, and the dispersion is very small as represented by a large Abbe number. The relative partial dispersion of a long crown is positive. The "long spectrum" is due to a large spectral separation of absorption peaks. Examples of long crown are fluorophosphate glass and calcium fluoride crystal. Both materials are more expensive and more difficult to process than crown glass.

A short flint employs defects that reduce the lifetime of dipole oscillations. Consequently, the amplitude of the dipole current grows less rapidly while approaching resonance, and the partial dispersion is reduced. The relative partial dispersion of a short flint is negative. Consequently, a short flint may counter the partial dispersion of a crown. The reduced dipole current also indicates a broadening of the ultraviolet absorption band. This broadened absorption band shortens the spectral length between absorption bands. The broadened ultraviolet absorption band might penetrate the blue spectrum. A broadened spectrum of the infrared band has no effect upon the red spectrum. Examples of short flint are lead borate, and niobium silicate. A recently developed short flint is zirconium-doped tantalum silicate.

A lanthanum flint employs the tightly bound electrons of a rare earth metal. The high atomic number of a rare earth metal provides a much larger electron density than a long crown. A lanthanum flint typically displays a negative relative partial dispersion.

A dense crown provides a higher refractive index than a crown or long crown. The higher refractive index can reduce astigmatism and spherical aberration. A dense crown typically displays a positive relative partial dispersion.

A dense flint provides a higher refractive index than a crown or long crown. The higher refractive index can reduce astigmatism and spherical aberration. A dense flint displays increasing dispersion at shorter wavelengths. Consequently, the benefits of a dense flint often create more lateral color in the blue spectra.

Recent developments of short flints were motivated by ecological concerns about lead borate. The use of niobium, tantalum, and zirconium has created new short flints with superior qualities. In particular, N-KSFS11 by Schott employs zirconium-doped tantalum oxide within a largely silica glass network. The tantalum oxide provides a higher refractive index than past short flints. The zirconium doping shortens the resonant lifetime of the tantalum oxide. Other vendors such as Ohara Inc. of Japan (hereinafter "Ohara") did not employ zirconium doped tantalum oxide as of 2011. Thus, N-KSFS11 was unique to Schott North America, Inc, at least as of 2011.

CCD Size: A KAI-08050 sensor by the Eastman Kodak Company of Rochester, N.Y., USA (hereinafter "Kodak") employs four CCDs on a single chip. The sensor diagonal is 22.66 mm. Each sub-sensor has its own external circuitry. A large CCD is desired for rapid mapping of a large specimen such as a tissue specimen. However, the large angular size of the KAI-08050 detector occupies a compromised portion of the field of tube lens in the prior art. Thus, implementation of a larger CCD with 25 mm diagonal has been limited by the quality of the tube lens. In particular, the lateral color of tube lens is compromised at field margin. Astigmatism and Petzval curvature of the tube lens are also common at large diagonals of 25 mm.

20× Objective Lens: A popular objective lens for pathology is an apochromat, such as part number UPLSAPO 20×, by Olympus America, Inc. of Center Valley, Pa., (hereinafter "Olympus") at 20× at 0.75 NA. Herein, the vision NA is defined by the objective NA. The brightness of the image background is determined by the 0.75 NA of vision when the NA of illumination is larger. However, the resolution is not determined by 0.75 NA of vision. The typical cover strata of a tissue specimen create spherical aberration beyond the correction of the objective lens. Consequently, the diffraction limit of the objective is circa 0.50 NA. The annular NA of vision from 0.50 to 0.75 provides space for an illumination lens stop at 0.60 NA. A properly designed vision lens-stop at 0.50 NA can stop the illumination at 0.60 NA to 0.50 NA without scatter by the inside faces of the glass elements. A sharp edge to aperture defines a proper design for a vision lens stop. The effective NA of illumination at 0.50 can precisely match the NA of vision without background fog from scatter.

The measured densities of glass components of the Olympus UPLSAPO 20× indicate fluorophosphate and niobium silicate as two of the glass types. The fluorophosphate is a long crown, and the short flint is a niobium silicate. Thus, the apochromat at 20× at 0.75 NA includes long crown and short flint as glass types.

Critical Illumination: In 1875, Nelson empirically determined that an optical system is spatially incoherent when the illumination NA exceeds 0.75 times the vision NA. This condition defines the "critical illumination" of Nelson. In practice of the current invention, an illumination NA at 0.80 times the vision NA creates a small edge overshoot which is highly beneficial to image quality. The edge overshoot is created by a negative partial coherence between adjacent point spreads of the objective lens. The partial coherence of the illumination field is defined by the Fourier transform of the angular profile of the source. Thus, a nominal range for Nelson's critical illumination is defined as an illumination NA at 0.75-0.85 times the vision NA. Nelson employed an image of the source at the object of illumination. Consequently, numerous authors erroneously indicate "critical illumination" as a source image located at the object. Thus, "critical illumination" must be defined by the relation of illumination NA to objective NA.

Kohler Illumination: In 1893, Kohler defined an illumination system with the source image at a great distance from the object of illumination. Typically, the distant image of the source is created by location of a source image at the front focal point of the condenser lens. However, the lens stop of the objective lens is frequently not located at the back focal point of the objective. Thus, the location of the source conjugate must be carefully considered.

A Kohler illumination system is defined by Seward in *Optical design of microscopes* published by SPIE Publications in 2010. There, the illumination system has a source, a source lens, an illumination field stop, an illumination lens stop, a condenser lens, and an illumination field. The Kohler illumination system creates a distant image of the source from the illumination field.

Bistable Telescope: There are two common formats of a refractive telescope: a Keplerian, and a Galilean. A Keplerian telescope employs an objective lens and ocular lens, both with positive power. A Galilean telescope employs an ocular lens with negative power. A Galilean telescope is shorter than a Keplerian telescope at the same magnification. The reduction in length between Galilean and Keplerian telescopes is twice the effective focal length of the ocular lens. The shorter path length of a Galilean telescope is preferred in the tube of a microscope.

The prior art contains examples of telescopes within microscopes. For example, U.S. Pat. No. 4,195,903 to Kawase describes a rotatable Galilean telescope within the tube region of an infinity-corrected microscope. In U.S. Pat. No. 4,673,973, Ledley describes a Galilean telescope within one arm of a split optical system.

The bistable telescope is related to numerous patents. In U.S. Pat. No. 3,804,506, for example, Fletcher describes a camera shutter with rotary solenoids operative to actuate shutter blades. An inertial damper and a stop plate are built into each solenoid to prevent shock and rebounding.

With U.S. Pat. No. 4,262,989, Waters teaches changeable sets of Galilean optics mounted on a rotary shaft that is rotated by a rotary solenoid. Three magnifications are achieved by a single Galilean telescope at three orientations: forward along the optic axis, backward along the optic axis, and across the optic axis. The shaft and the optics are fixed at angular dispositions by engagement of a detent ball with grooves in a detent plate.

U.S. Pat. No. 7,245,425 to Miyashita is directed to an optical system with an objective lens and an intermediate magnification varying part in the form of a telescope. The telescope rotates by 180 degrees to reverse direction. At magnification of 1.4×, the telescope achieves a 2× change in magnification between modes. The system also includes a reduction stop in one mode.

Nyquist Parameters: The cut-off frequency of a diffraction-limited objective lens is $$f_{CO} = \frac{2NA}{\lambda}.$$

At 0.588 um, the cutoff frequency for the diffraction-limited 0.50 NA objective is 1.70 cycles per um. The Nyquist rate is the minimum sampling rate at which there is no overlap of the replicated spectra. The replicated spectra are centered at the harmonic frequencies of the sampling wave form. An overlap between replicated spectra creates aliasing. The Nyquist rate at 0.50 NA and 0.588 um wavelength is 3.4 cycles per um. FIGS. 3A and 3B display examples of replicated spectra with and without aliasing.

In FIG. 3A, an 11.00 um pixel and 20× magnification defines the sampling frequency as 1.82 cycles per um. There is significant aliasing from the replicated spectrum. The optical transfer function (OTF) of the irradiance is defined as the addition of the replicated spectrum to the original spectrum. Thus, the OTF is artificially large near the cut-off frequency at 1.70 cycles per um. The magnitude of the replicated spectrum is defined by the duty cycle of the pixel sampling pattern. Thus, the magnitude of the replicated is smaller than unity. At any magnitude of the replicated spectrum, the aliasing creates an artificially large OTF near the cut-off frequency at 1.70 cycles per um.

In FIG. 3B, an 11.00 um pixel and 40× magnification defines the sampling frequency as 3.64 cycles per um. There is no aliasing from the replicated spectrum. Thus, the optical transfer function (OTF) is a true description of the optical system up to the onset of replicated spectrum. The original spectrum may extend to one-half of the sampling frequency without aliasing. This condition lays the foundation for the Nyquist frequency, which has been defined as one-half of the sampling frequency. The Nyquist frequency represents the largest spatial frequency that can be sampled without aliasing. In a system with an 11.00 um pixel, the Nyquist frequency is 0.91 cycles per um at 20× as FIG. 3A, and 1.82 cycles per um at 40× as in FIG. 3B. The Nyquist frequency at 40× exceeds the cut-off frequency at 1.70 cycles per urn, while the Nyquist frequency at 20× does not.

The Nyquist parameters of the current invention are summarized in Table 1 below. The 11.0 um pixel is defined by use of the Bayer pixel of a Kodak KAI-08050 as referenced hereinabove, which has a pixel size of 5.5 μm. Clearly, the 40× mode satisfies both Nyquist conditions for sampling without aliasing, while the 20× does not. A 0.50 NA microscope with 11.0 um Bayer pixel displays aliasing. Thus, a 2× telescope is essential for the elimination of aliasing in a typical 20× microscope for pathology.

TABLE 1

| Nyquist parameters of the 20X and 40X magnifications | |
|---|---|
| Parameter | Value |
| Pixel | 5.50 μm |
| Bayer pixel | 11.00 μm |
| Projected Bayer pixel at 20X | 0.55 μm |
| Projected Bayer pixel at 40X | 0.28 μm |
| Cut-off frequency (588 nm, 0.50 NA) | 1.70 cyc/μm |
| Nyquist rate (2X cut-off fequency) | 3.40 cyc/μm |
| Sampling frequency at 20X | 1.82 cyc/μm |
| Sampling frequency at 40X | 3.64 cyc/μm |
| Nyquist frequency at 20X | 0.91 cyc/μm |
| Nyquist frequency at 40X | 1.82 cyc/μm |

Table 1: Nyquist Parameters of the 20× and 40× Magnifications

Pathology Laboratories: Prior to the invention disclosed herein, a pathologist would inspect tissue for disease by peering through a microscope. These microscopes are tabletop items, and it is recognized that most pathology laboratories prefer tabletop instruments with room for cabinets above. Thus, the present inventor has appreciated that an optical system for pathology should employ a folded optical path to minimize the height of the instrument.

Tube Lenses: In U.S. Pat. No. 5,699,196 to Misawa, a tube lens is disclosed. The tube lens is a doublet pair with a front tube length approximately 0.7 times the effective focal length. A short flint is employed, but there is no long crown. In application to a 10 mm lens stop, the lens at 200 mm in effective focal length is nearly diffraction-limited from 0 to 13 mm of field height. It is a high quality lens, but it lacks sufficient tube length for an optical platform, a folding mirror, and a bistable telescope.

FIG. 4A displays a common tube lens of several patents, such as the '196 patent to Misawa, that are assigned to the Nikon Corporation of Tokyo, Japan. FIG. 4B displays the ray-intercept plot at 1.7° which is defined by a 6.0 mm image field at an effective focal length of 200 mm. The front tube length at 140 mm is 0.7 times the effective focal length at 200 mm. The lens stop at 10 mm in diameter is 0.05 times the effective focal length. It comprises a plano-convex doublet N10 and a meniscus doublet N20. The plano-convex doublet comprises a dense crown element N11 in SK10 and lanthanum flint element N12 in LaFN4. The meniscus doublet comprises a dense flint element N13 in BaSF6 and short flint element N14 in KzFSN4.

In U.S. Pat. No. 5,739,957 to the Konishi, a tube lens is described with a doublet pair that is common to other patents assigned to the Olympus Optical Co., Ltd. of Tokyo, Japan. The front tube length is approximately 0.4 times the effective focal length at best performance at a 13 mm field. In application to a 9 mm lens stop, the lens at 180 mm in effective focal length is nearly diffraction-limited from 0 to 13 mm of field height. It too is a high quality lens, but it lacks sufficient front tube length for an optical platform, a folding mirror, and a bistable telescope. The configuration of the Olympus tube lens described above is very similar to the Nikon lens of FIG. 4A. The first glass element is a long crown in S-FSL5. The second element is a lanthanum flint in S-LAH53. The third element is a lanthanum flint in S-LAH60. The fourth element is a short flint in BPH35.

Airy Radius: The radius of the Airy pattern is defined as $$r_{Airy} = 0.61 \frac{\lambda}{NA}.$$

At a magnification of 20 and an NA of 0.50 for objective lens, the NA of the tube lens is 0.025. Thus, the Airy radius of the d-line is 14.4 µm at the image sensor IS. Lateral color of the image at the image sensor IS should be less than 7.2 µm, which is half the Airy radius.

At a magnification of 40 and an NA of 0.50 for objective lens, the NA of the tube lens is 0.0125. Thus, the Airy radius of the d-line is 28.8 µm at the image sensor IS. Lateral color of the image at the image sensor IS should be less than 14.4 µm, which is half the Airy radius.

Field Flattener: A typical field flattener is a plano-concave singlet placed near the image sensor IS. However this solution can create undesirable lateral color. A typical field flattener has a negative optical power.

In U.S. Pat. No. 7,808,724, the present inventor disclosed a telecentric lens with a positive meniscus lens as a field lens near the image sensor. The positive meniscus lens comprises a front element in plano-convex shape of lanthanum crown, and a back element in plano-concave shape of dense flint. The positive meniscus lens transforms an off-axis chief ray into a telecentric chief ray at the image sensor. The positive meniscus lens also flattens the image field. Rays are separated by field in a positive meniscus lens, which enables correction of both astigmatism and lateral color within the positive meniscus lens. The lens stop LS can be placed near the front focal point of the positive meniscus lens to ensure a telecentric lens that delivers the chief ray at normal to the sensor. A microlens of the image sensor IS might require a chief ray at normal.

Eyepieces: An eyepiece is a magnifier with a lens stop of the objective as the entrance pupil. The eyepiece and lens stop are separated by a tube length. The effective focal length of an eyepiece is typically 25 mm. A typical tube length is 160 to 200 mm. Thus, the tube length of an eyepiece is normally 6 or more times the effective focal length. The exit pupil is near the back focal point, and the field angle is typically greater than 40 degrees.

A tube lens differs from an eyepiece in that the lens stop of a tube lens is located at near the front focal point while the lens stop of an eyepiece is located at 5 or more effective focal lengths from the front focal point. The exit pupil of a tube lens is very distant from the back focal point while the exit pupil of an eyepiece is near the back focal point. The field angle of a tube lens is less than 4 degrees, while the field angle of an eyepiece is greater than 40 degrees. It will thus be appreciated that tube lenses are largely different from typical eyepieces.

Several prior art eyepieces are described below. None appear to teach a tube length in ratio to effective focal length at near 1.3 as in the novel tube lens disclosed herein. The eyepieces also do not appear to claim the use of a short flint or long crown as the glass type.

With U.S. Pat. No. 3,421,807, Nothnagle discloses an eyepiece with a biconvex singlet and a plano concave doublet. The plano concave doublet comprises a biconvex lens and a plano concave lens. In U.S. Pat. No. 4,017,159 and U.S. Pat. No. 3,994,570, Sussman discloses a specific prescription to a first element as a biconvex singlet and a second element as a plano convex doublet. Still further, in U.S. Pat. No. 5,790,313, Kanai specifies the effective focal length of the first biconvex lens as >1.5 times the effective focal length of the eyepiece, which may be employed under the present invention. However, Kanai specifies an aspheric surface, which is not required under the invention disclosed herein.

A Konig eyepiece comprises a biconvex singlet and a convex-concave doublet. The biconvex singlet is nearly plano convex. The convex-concave lens has similar radii of curvature at the front and back thereof, but the location of image conjugates differs greatly. The optical path comprises a lens stop, a tube length at 6-8 times the effective focal length, an image conjugate on the front side of the eyepiece at the front focal point, the eyepiece, and an image conjugate on the back side of eyepiece at infinity. Thus, the location of the image conjugate of an eyepiece is very different from the location of the image conjugate of a tube lens. The front image conjugate of an eyepiece is located at the front focal point inside the tube while the front image conjugate of a tube lens is located at infinity outside the tube.

A reversed Kellner eyepiece (RKE) has a biconvex singlet and a convex-concave doublet. The biconvex singlet is symmetric, but the location of image conjugates differs greatly. The optical path comprises a lens stop, a tube length at 6-8 times the effective focal length, an image conjugate on the front side of the eyepiece at the front focal point, the eyepiece, and an image conjugate on the back side of eyepiece at infinity. Accordingly, the location of the image conjugate of an eyepiece is very different from the location of the image conjugate of a tube lens.

An eyepiece is disclosed by by Imaizumi in U.S. Pat. No. 5,731,905 where a doublet is defined with a radius of the center surface in the doublet $r_C$ and a change in refractive index across the center surface $\Delta n_C$. These parameters satisfy the conditions below for correction of lateral color.

$$3.8 < \{-r_C/\Delta n_C\}/f < 5.3$$

The application of the Imaizumi condition yields:

$$\{-r_C/\Delta n_C\}/f = 4.1$$

With a knowledge of the foregoing, the present inventor has appreciated that, despite the numerous disclosures by highly skilled scientists and inventors, there remains a need for a tube lens with a long front tube length as disclosed herein that has application to digital pathology, cytology, hematology, and still other applications.

SUMMARY OF THE INVENTION

The present invention is thus founded on the basic object of providing a tube lens with a long front tube length for application to optical systems for digital pathology, cytology, hematology, and still other applications.

A more particular object of embodiments of the invention is to provide a tube lens that exploits novel glass types to permit a long front tube length with sufficient correction of lateral color for the spectra of a white LED and a color CCD at large field angle.

In particular applications, an object of the invention is to provide a tube lens with a long front tube length with color correction to achieve excellent resolution of, for example, tissue stained with heamatoxolin and eosin.

A further object of embodiments of the invention is to provide a tube lens with a long front tube length to permit the incorporation of components for digital pathology, such as an optical platform, a folding mirror, and a bistable telescope.

Another particular object of the invention is to provide an optical system with a tube lens and a telescope that provides additional magnification toward sampling an image without aliasing.

These and in all likelihood further objects and advantages of the present invention will become obvious not only to one who reviews the present specification and drawings but also to those who have an opportunity to make use of an embodiment of the tube lens with a long front tube length disclosed herein. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

An optical system incorporating the tube lens TL disclosed herein is shown in FIG. 5. The optical system has a lens stop LS and a tube lens TL with a singlet 10 and a doublet 20. The tube lens TL has a front tube length of the optical distance between the lens stop LS and the singlet 10. As used herein, a long front tube length is defined as longer than 1.0 times the effective focal length. A combination of long crown and short flint substantially corrects the lateral color between the g, F, d, and C spectral lines. The color correction of the tube lens TL is beneficial to a combination of a white LED and a color CCD image sensor IS. The image sensor IS is placed at the back focal point of the tube lens TL. A long front tube length at 1.3 times the effective focal length provides sufficient space for items specific to digital pathology, such as an aperture of an optical platform OP, a folding mirror FM, and a bistable telescope TS. The tube lens TL defines a magnification of 20× in combination with a 20× 0.50 NA objective lens OL.

The bistable telescope TS provides two modes: a 1× mode and a 2× mode. The bistable telescope TS comprises a front doublet 30 of long crown and short flint and a back doublet 40 of dense crown and short flint. The combination of the tube lens TL and the bistable telescope TS substantially corrects the lateral color at the g, F, d, and C lines. The color correction of the tube lens TL and the telescope TS is beneficial to a combination of a white LED and a color CCD sensor. The 2× magnification of the telescope TS extends the Nyquist frequency of an 11 µm Bayer pixel to beyond the cut-off frequency of a 20× 0.50 NA objective lens at 588 nm.

The tube lens TL is applicable to color digital imaging by a microscope. A color CCD sensor displays a broader blue spectrum than a human eye, and a white LED displays a broader blue spectrum than a human eye. Consequently, a tube lens TL must display an extraordinary correction of lateral color for application to a color CCD camera and white LED.

Digital pathology in a clinical environment requires two important features: a rapid shift between magnifications of 20× and 40× and a suitable format for a bench top. A bistable telescope TS can provide the rapid change between 20× and 40×. A folding mirror FM can reduce the instrument height to below a maximum height requirement for bench-top operation. Ideally pursuant to the present invention, the bistable telescope TS and the folding mirror FM are placed within the front tube length of the tube lens TL. This requires a long front tube length in the tube lens TL.

The combination of a broader blue spectrum, long front tube length, and large field angle places extraordinary demands on the tube lens TL. The long front tube length allows a fixed angular extent at the objective lens stop LS to grow much larger in spatial extent at the tube lens TL. Consequently, the tube lens TL is larger in diameter than normal, and the rays at the margin of lens are bent more than normal. The increased bending should also increase lateral color and astigmatism. The broader blue spectrum also increases the lateral color. A conventional tube lens cannot satisfy these increased demands on lateral color.

The deviation in thickness of the cover strata of a tissue specimen limits the practical NA of an objective to 0.40 NA. In *Optical design of microscopes* by Seward, which is previously referenced, a deviation in cover thickness by 120 um is shown to establish the central NA of the objective as approximately 0.40. The lens is diffraction limited at or below the central NA. Above 0.50 NA, the lens is aberration limited. An empirical measure of the central NA is 0.50 for 0.75 NA objective in application to specimen for digital pathology.

A typical objective lens for pathology without a CCD is 20× in magnification with 0.75 NA. The central NA at 0.50 of this objective lens distributes approximately 50% of the collected light into a diffraction-limited spot. The other 50% beyond the central NA is distributed into an aberration-limited spot. The aberration-limited spot is more than ten times the size of the diffraction limited spot at 0.50 NA. The enormous size of the aberration-limited spot brightens the background without blurring the diffraction-limited spot of the central NA. The brighter background is beneficial to a human observer at the eyepiece of a microscope. However, it is detrimental to a CCD sensor due to an increase of shot noise of the background. During validation of the initial prototypes of the present invention, the measurement of edge profiles corroborated approximately 0.50 as the central NA of diffraction limit.

The shot noise of a CCD pixel can be estimated as the square-root of the photon electron count. Thus, the ratio of signal to shot noise is 100 for 10,000 photo-electrons, while the ratio is 141 for 20,000 photo-electrons. The typical read noise of a CCD is 25 electrons; thus, the shot noise is paramount. A typical CCD pixel for microscopy has a full-well capacity of 20,000 electrons.

During validation of initial prototypes, the frequency spectrum of the edge profile at 0.50 NA indicated the sampling rate of the Bayer pixel at 11 um as insufficient for sampling without aliasing. Sampling by a pixel array creates replicas of the image frequency spectrum at the harmonic frequencies of the sampling rate. Aliasing indicates the detrimental effects of the overlap of replicated spectra at the harmonics of the sampling rate.

In furtherance of the objects of the invention, the tube lens TL disclosed herein employs a front tube length that is greater than 1.0 times the effective focal length of the tube lens TL. A front tube length at 1.3 times the effective focal length provides sufficient room for essential elements in digital pathology, such as an aperture of an optical platform OP, a folding mirror FM, and a bistable telescope TS.

The increased demands upon lateral color are addressed by a novel combination of glass types in a tube lens TL. A combination of a long crown, which can be calcium fluoride, and a short flint, which can be Zr-doped tantalum silicate, provides a unique solution to demands upon lateral color and astigmatism in a tube lens TL.

It is noted that both materials are expensive to manufacture and difficult to process. The calcium fluoride is a single crystal that is expensive to grow and easy to crack. The Zr-doped tantalum silicate is reactive to atmosphere. However, the benefits of these materials offset the expense and difficulty in production since their combination creates essential color correction of a tube lens TL with a long front tube length.

Advantageously, the implementation of novel glass types within a tube lens TL permits a long front tube length with sufficient correction of lateral color for the spectra of a white LED and color CCD. The color correction of the tube lens TL provides excellent resolution of tissue stained with haematoxolin and eosin. The long front tube length permits the incorporation of essential components for digital pathology, such as an optical platform OP, a folding mirror FM, and a bistable telescope TS. The telescope TS provides additional magnification toward sampling the image without aliasing.

One will appreciate that the foregoing discussion broadly outlines the more important features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawings:

FIG. 8C is a lateral color plot of the tube lens with the field flattener of FIG. 8A;

FIG. 8D is a Petzval curvature plot of the tube lens with the field flattener of FIG. 8A; and FIG. 8E is a distortion plot of the tube lens with the field flattener of FIG. 8A.

DETAILED DESCRIPTION OF PREFERRED EMBODIMENTS

It will be appreciated that the tube lens with a long front tube length disclosed herein is subject to widely varied embodiments and applications. However, to ensure that one skilled in the art will be able to understand and, in appropriate cases, practice the present invention, certain preferred embodiments and applications of the broader invention revealed herein are described below and shown in the accompanying drawing figures. Before any particular embodiment or application of the invention is explained in detail, it must be made clear that the following details of construction, descriptions of geometry, and illustrations of inventive concepts are mere examples of the many possible manifestations of the invention.

Definitions: There are several definitions in practice for glass type and glass names. A glass type defines a range of optical parameters. A glass name defines a unique set of optical parameters. The phrase "optical properties of a glass name" specifies all parameters with relation to the refractive indexes at the g, F, d, and C lines.

As used herein, the glass types are defined as follows. A long crown indicates an Abbe number $V_d$ at 70 or more. A flint indicates an Abbe number $V_d$ at 50 or less. A short flint indicates a negative relative partial dispersion $\Delta P_{gF}$. A dense flint indicates an Abbe number $V_d$ at 50 or less and a refractive index at 1.65 or more. A dense crown indicates an Abbe number $V_d$ between 55 and 62 and a refractive index at 1.54 or greater.

The glass names are those used by Schott North America, Inc. of Elmsford, N.Y., USA (hereinafter "Schott"). The refractive index values of each glass are displayed in the Schott optical glass data sheets. The compositions are cited in the material safety data sheets MSDS of Schott.

Figure 5:
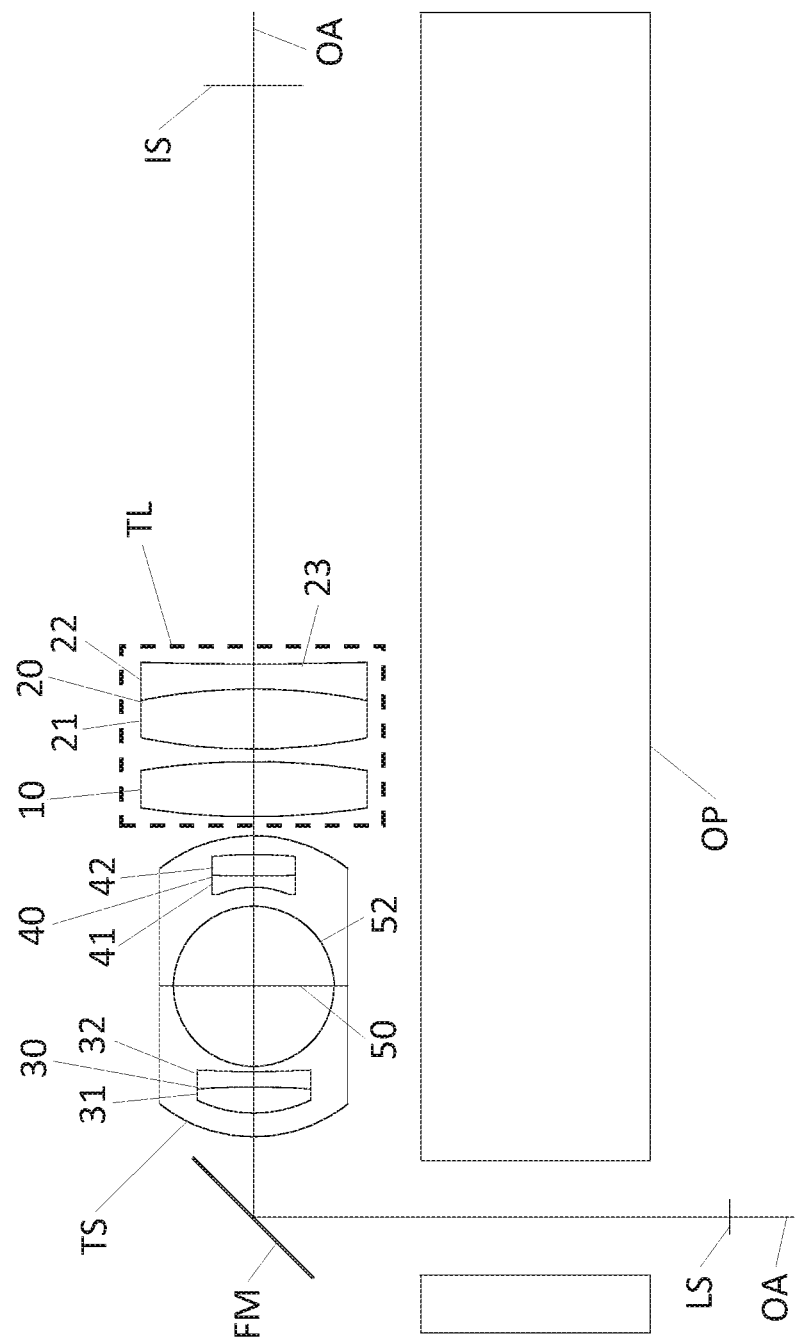
FIG. 5 is a view in side elevation of an optical system incorporating a tube lens according to the invention with an optical platform, a folding mirror, and a telescope.

An optical system with a tube lens TL with a long working distance is shown in FIG. 5. The elements of the optical system are located along a folded optic axis OA. The tube lens TL operates in two modes of magnification with an objective lens OL at 9 mm in effective focal length. A 20× embodiment of the optical system comprises a lens stop LS, an optical platform OP, a folding mirror FM, a tube lens TL, and an image sensor IS. A 40× embodiment comprises the 20× embodiment plus a telescope TS that is placed between the folding mirror FM and the tube lens TL.

The tube length of a microscope is defined as the distance from the lens stop LS to the image conjugate. In a microscope with an objective with infinity correction, a tube lens TL creates an image conjugate at the back focal point of the tube lens TL. The back tube length is the distance from the front of the tube lens to the back focal point. Thus, the tube length of an infinity-corrected microscope has two portions: a front tube length and a back tube length.

Herein, the front tube length is defined as the optical distance from the lens stop LS to the front of the tube lens TL. The back tube length is defined as the optical distance from the front of the tube lens TL to the back focal point of the tube lens TL. The optical distance of front tube length is the equivalent distance in air. Thus, 15 mm of borosilicate is roughly 10 mm of optical distance.

The front tube length of the first embodiment is approximately 1.3 times the effective focal length of the tube lens TL. The front tube length is deemed a long front tube length at values greater than 1.0 the effective focal length. Above 1.5 times the effective focal length, a long front tube length creates lateral color beyond the correction of this embodiment. Thus, a long front tube length is defined as 1.0 to 1.5 times the effective focal length for this embodiment.

Figure 6A:
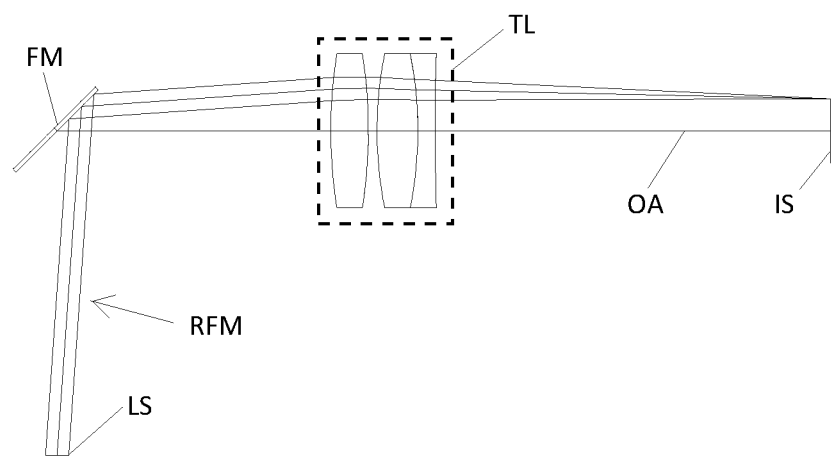
FIG. 6A is a view in side elevation of a tube lens as disclosed herein.

The image field of the embodiment of FIG. 6A is 4.0°. The image field is defined by a 25 mm diagonal of the image sensor IS and an effective focal length at 180 mm. At 4.0° in field angle, long crown CAF2 is required for correction of lateral color. The Abbe number of CAF2 is 95.0. At 2.7° in field angle, the long crown N-FK5 is acceptable. The Abbe number of N-FK5 is 70.4. At 2.0° in field angle, the crown silica is not acceptable for correction of lateral color. The Abbe number of silica is 67.8. Thus, it has been found that a long crown sufficiently corrects lateral color at field angles from 2.0° to 4.0°, wherein the field angle is an angle with optic axis OA.

The nominal F-number of the first embodiment of the tube lens TL is 20. It will be appreciated that the invention is not limited to a specific F-number. The shape and glass types of the tube lens TL are required for a range of front tube length FTL and a range of field angle.

Referring again to FIG. 5, the tube lens TL comprises a front singlet 10 and a back doublet 20. The present inventor has recognized that the correction of lateral color in a long front tube length at 1.3 times the effective focal length and a large image field at 25 mm in diameter requires a novel combination of glass for the tube lens TL. The glass of the front singlet 10 is an element of positive optical power in glass of long crown. This statement may be shortened to "a positive element of long crown" wherein the positive modifier indicates a positive power. The negative modifier shall indicate a negative positive power. The back doublet 20 comprises a front positive element 21 in a long crown and a back negative element 22 in a short flint. The back negative element 22 is "a negative element of short flint."

The telescope TS comprises front doublet 30 and back doublet 40. The front element 31 of the front doublet 30 is a positive element in long crown. The back element 32 of the front doublet 30 is a negative element in short flint. The front element 41 of the back doublet 40 is a positive element in dense crown, and the back element 42 of the back doublet 40 is a negative element in dense flint.

The telescope TS has a rotation axis 50 at normal to the optic axis OA. In the 20× embodiment, a clear aperture 52 of the telescope TS is centered on the optic axis OA. In the 40× embodiment, the front doublet 30 and the back doublet 40 are centered on the optic axis OA.

The first embodiment of the tube lens TL is depicted in FIG. 6A and quantified in Table 2 below. Specific elements of the tube lens TL are displayed in the larger view of FIG. 5. In FIG. 6A, the optical system comprises a lens stop LS, a long front tube length, a tube lens TL and an image sensor IS. The ray fans to the field margin RFM indicate rays from the lens stop LS to the margin of the image sensor IS. The image sensor IS is placed at the back focal point of the tube lens TL.

Table 2: Prescription of the Tube Lens

Figure 6B:
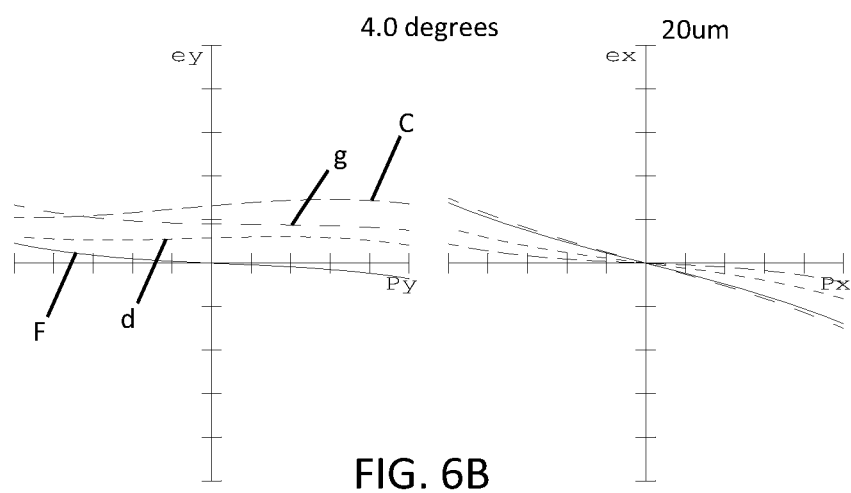
FIG. 6B is a ray intercept plot of the tube lens of FIG. 6A.

The ray intercept plot of FIG. 6B applies to rays from field margin RFM at 4.0° of field angle at the lens stop LS. The plot at left indicates a lateral color at less than 8 μm. Thus, the lateral color is circa one-half the Airy radius at 14.4 μm. The slope of the plot at right indicates a geometric defocus at less than 12 um at the field margin. This indicates a curved image surface at Petzval radius at 236 mm in radius. The Petzval radius may be corrected by a field flattener near the image sensor IS.

The ray intercept plot of FIG. 6B indicates lateral color coma and Petzval curvature. The lateral color is less than 6.0 um which is much less than Airy radius at 14.4 um. The slope of the ex-intercept at the margin of the field indicates at Petzval curvature in similar magnitude to the lateral color. Equal magnitudes of the two largest aberrations may be considered an optimum design. The small cubic component of the ey-intercept indicates a small amount of spherical aberration. The dissimilar slopes by wavelength in the ex-intercept indicate axial color. The dissimilar slopes between the ey- and ex-intercepts indicate astigmatism. Lateral color, Petzval curvature, and astigmatism are the three largest aberrations in the embodiment of FIG. 6A.

Figure 6C:
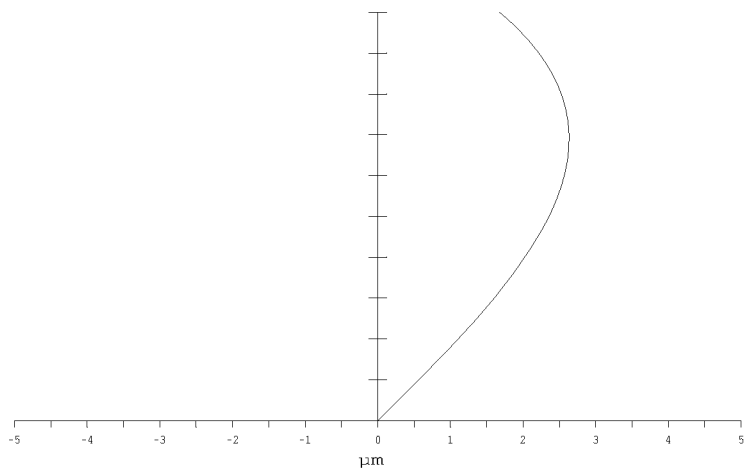
FIG. 6C is a lateral color plot of the tube lens of FIG. 6A.
Figure 6D:
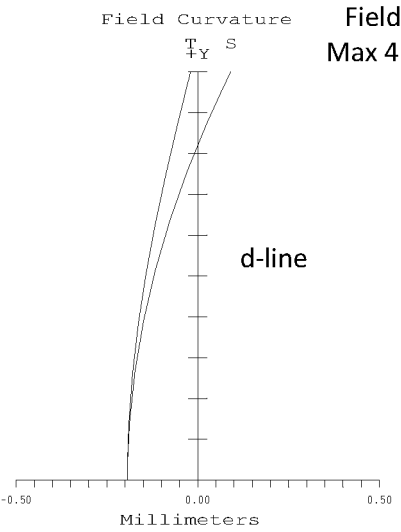
FIG. 6D is a Petzval curvature plot of the tube lens of FIG. 6A.
Figure 6E:
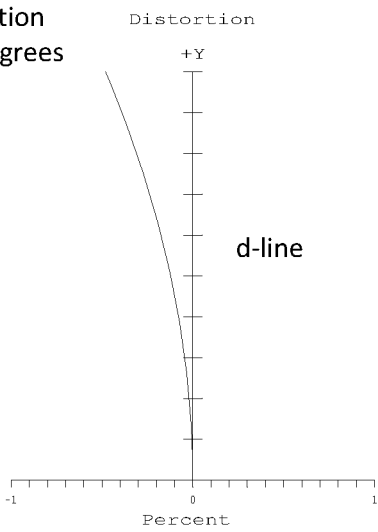
FIG. 6E is a distortion plot of the tube lens of FIG. 6A.

FIGS. 6C, 6D and 6E display the maximum lateral color, the field curvature, and distortion of the tube lens TL of FIG. 6A. The maximum lateral color of the tube lens TL is 2.6 um. The field curvature is less 210 um. At 20× in lateral magnification, the longitudinal magnification at 400× transforms the 210 um of Petzval curvature at the Image sensor IS into 0.5 um at the specimen. The distortion of the third embodiment is 0.48%.

The prescription of the tube lens TL of FIG. 6A is specified in Table 2 above. The lens stop LS diameter is 9.0 mm. The effective focal length of the tube lens TL is 180 mm. The front tube length is 232.5 mm. The ratio of the front tube length to the effective focal length is 1.29. The front singlet 10 and the front positive element 21 of the back doublet 20 are made of a long crown of crystalline calcium fluoride CAF2. The back negative element 22 of the back doublet 20 is a short flint of amorphous Zr-doped tantalum silicate N-KZFS11. The high Abbe number $V_d$ of the CAF2 indicates a low dispersion which is essential for correction of lateral color throughout the g, F, d, and C spectral lines. The high refractive index of the N-KZFS11 is required for correction of astigmatism by the back doublet 20. The larger dispersion (smaller $V_d$) at smaller magnitude optical power of the N-KZFS11 in the back negative element 21 of the back doublet 20 counters the smaller dispersion a larger magnitude optical of the elements

TABLE 2

Prescription of the tube lens

| Element | Surf | R | d | Glass | D | $n_F$ | $n_d$ | $n_C$ | $n_g$ | $V_d$ | $P_{g,F}$ | $\Delta P_{g,F}$ |
|---|---|---|---|---|---|---|---|---|---|---|---|---|
| LS |  | infinity | 126.21 |  | 9.00 |  |  |  |  |  |  |  |
| FM |  | infinity | 106.30 |  |  |  |  |  |  |  |  |  |
| 10 | front | 188.19 | 14.70 | CAF2 | 60.00 | 1.437 | 1.434 | 1.432 | 1.439 | 95.00 | 0.539 | 0.055 |
| 10 | back | −188.19 | 3.24 |  | 60.00 |  |  |  |  |  |  |  |
| 21 | front | 148.45 | 16.00 | CAF2 | 60.00 | 1.437 | 1.434 | 1.432 | 1.439 | 95.00 | 0.539 | 0.055 |
| 22 | front | −148.45 | 6.60 | N-KZFS11 | 60.00 | 1.648 | 1.638 | 1.633 | 1.657 | 42.41 | 0.561 | −0.012 |
| 22 | back | 903.60 | 153.63 |  | 60.00 |  |  |  |  |  |  |  |
| IS |  | infinity | 0.00 |  | 25.01 |  |  |  |  |  |  |  | units of distance is mm

File: TL180 3-1.ZMX    EFL = 180.00    FTL = 232.51    FTL/EFL = 1.29    TOTR = 426.68 in long crown. The negative relative partial dispersion $\Delta P_{g,F}$ of the short flint indicates a smaller partial dispersion than a normal flint. The negative relative dispersion $\Delta P_{g,F}$ of short flint offsets the positive relative dispersion $\Delta P_{g,F}$ of the long crown.

Figure 3A:
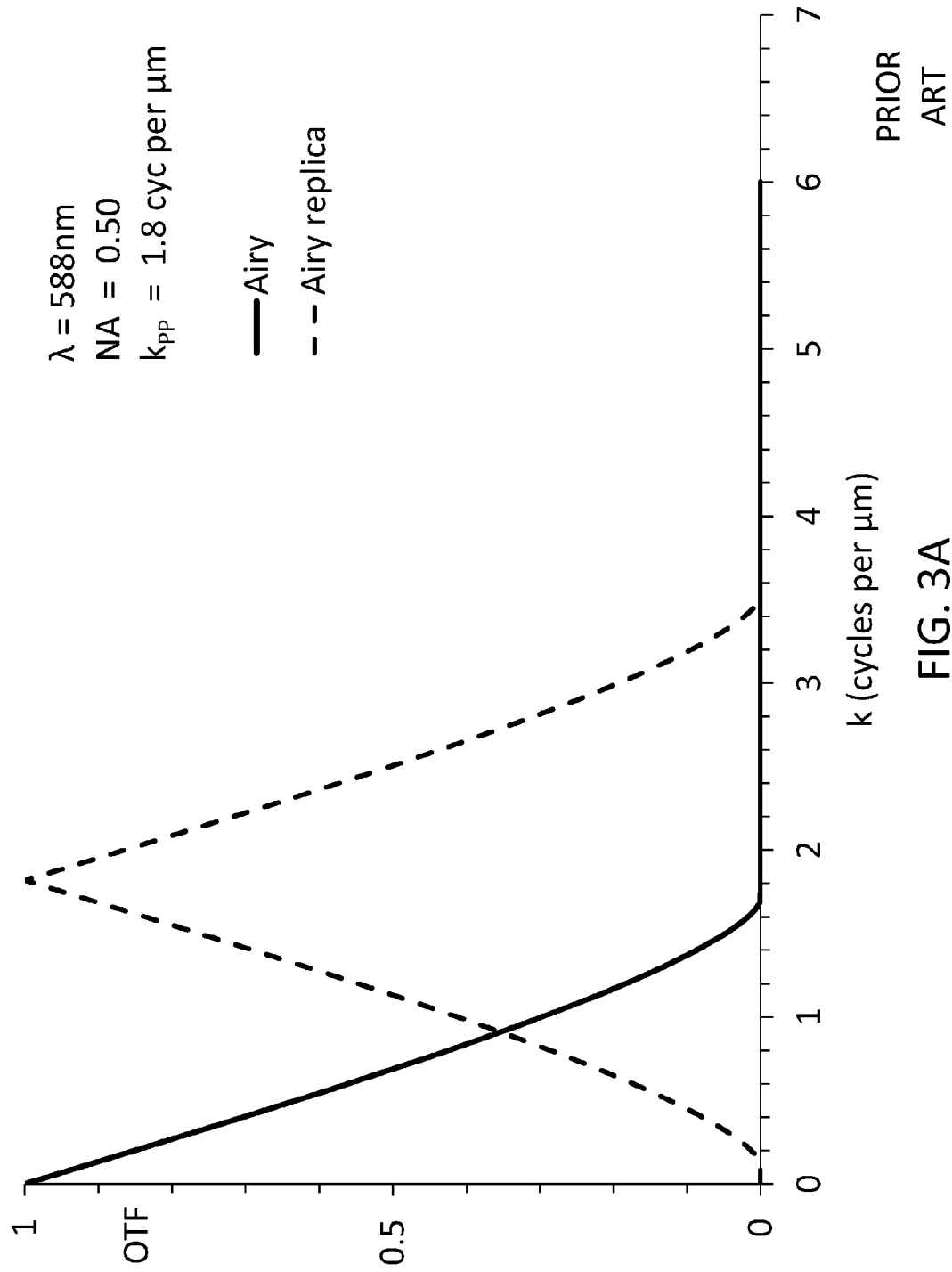
FIG. 3A is a graph of the OTF of a microscope at 20× magnification with aliasing.

The 9.0 mm diameter of the tube lens TL in combination with a 20× objective lens OL at 9.0 mm in effective focal length defines an objective NA of 0.50 and a magnification of 20. As previously indicated in Table 1 and FIG. 3A, the cut-off frequency at 588 nm and 0.50 NA is 1.70 cycles per μm, and the Nyquist frequency at 20× is 0.91 cycles per μm for an 11 μm Bayer pixel.

The cut-off frequency of the 20× mode at 1.70 cycles per μm greatly exceeds the Nyquist frequency at 0.91 cycles per μm. Consequently, the 20× mode of the tube lens TL creates a small amount of aliasing.

There are three aberrations of paramount importance to the rays of the field margin RFM: astigmatism, lateral color between the F and C lines, and lateral color between the g and F lines. The ratio of $n_d$ values specifies the ratios of the radii of curvatures of the elements and the consequential astigmatism. The ratio of $V_d$ values specifies the lateral color between the F and C lines. And finally, the ratio of $P_{g,F}$ values specifies the lateral color between the g and F lines.

The present inventor has found that the first aberration, astigmatism, can be addressed with a normal crown comprised of borosilicate and a normal flint of titanium silicate. The second aberration, lateral color between the F and C lines, can be satisfied with a long crown and normal flint. The low dispersion $V_d$ of the long crown is essential for correction of the lateral color between the F and C lines. The third aberration, lateral color between the g and F lines, requires an "anomalous partial dispersion" $P_{g,F}$ of the short flint which is smaller than the partial dispersion of a typical flint of the required $n_d$ and $V_d$ for the first two aberrations. This smaller partial dispersion $P_{g,F}$ is expressed by a negative relative partial dispersion $\Delta P_{g,F}$.

The low dispersions of the positive elements are indicated by high Abbe number at 95. The low dispersion of the positive elements is essential for correction of the lateral color between the F and C lines. The Abbe number of CAF2 is extraordinarily high at 95 in comparison to the borosilicate N-BK7 at 64. The Abbe number of the fluorophosphate glass N-FK5 at 70 is marginally acceptable. The Abbe number of a fluorophosphate glass at 80 or more is also acceptable. The Abbe number of the short flint at 50 or more indicates a larger dispersion than a crown. The negative relative partial dispersion $\Delta P_{g,F}$ of the short flint at −0.012 indicates a smaller partial dispersion $P_{g,F}$ than a normal flint. The absolute optical power of the positive elements in long crown is larger than the absolute optical power of the negative element in short flint. The larger partial dispersion $P_{g,F}$ at smaller absolute optical power of the short flint counters the smaller partial dispersion $P_{g,F}$ at larger absolute optical power of the long crown. The relative partial dispersion $\Delta P_{g,F}$ of the short flint must be optimized for correction of lateral color between the g and F lines, while the Abbe numbers are optimized for correction of lateral color between the F and C lines.

Figure 1:
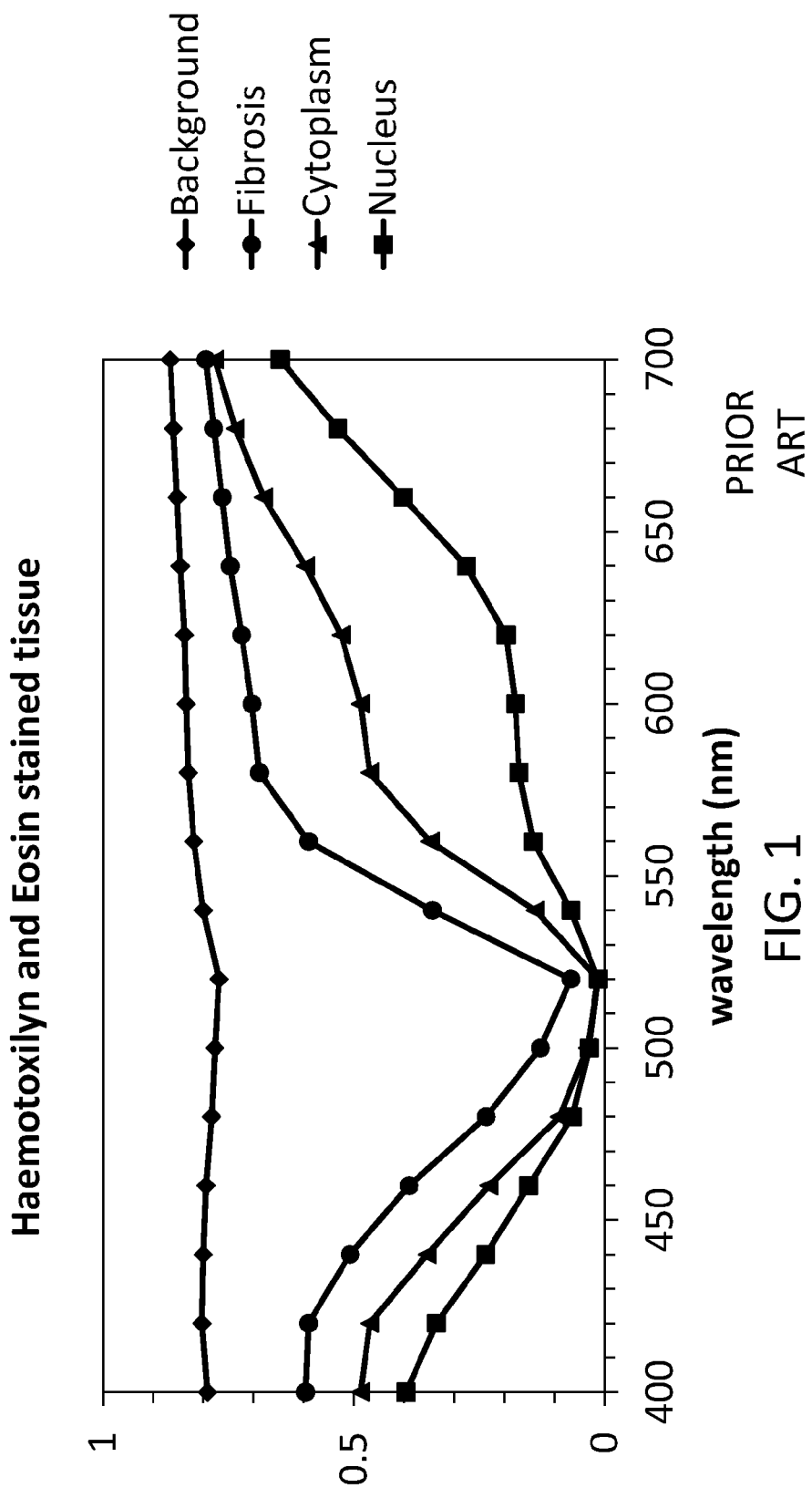
FIG. 1 is a graph of the transmission spectra of tissue stained by Haemotoxilyn and Eosin.
Figure 2:
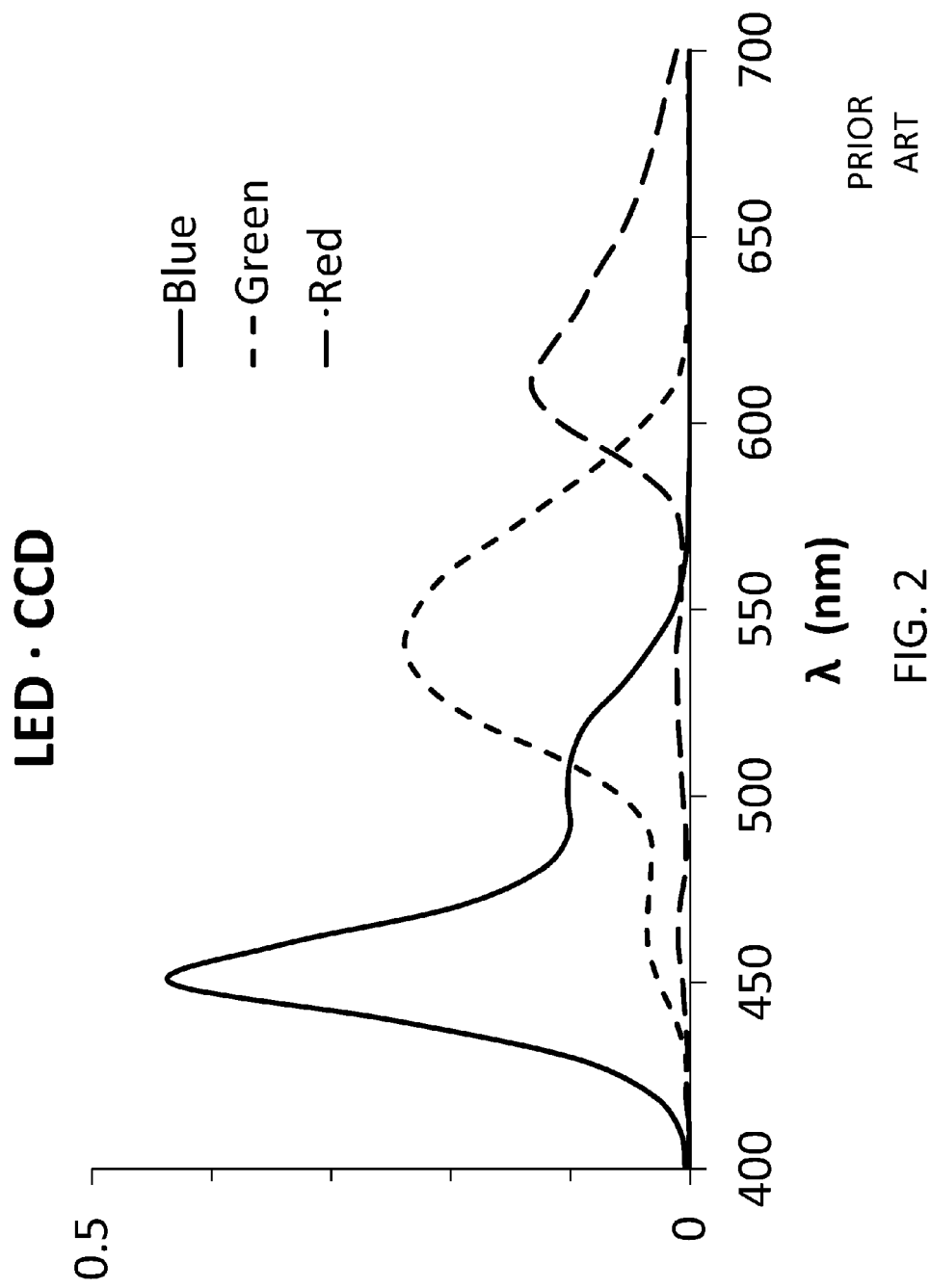
FIG. 2 is a graph of the color sensitivity of a combination of an LED and a CCD.

The balance of partial dispersions $P_{g,F}$ between the positive elements in long crown and the negative element in short flint is required for correction of lateral color of the blue spectral lines at g and F. The strong g-line components of the spectra in FIGS. 1 and 2 emphasize the need for a glass with a negative relative partial dispersion $\Delta P_{g,F}$. The N-KZFS11 by Schott, which is largely zirconium-doped tantalum oxide, is the only glass known to provide the desired performance of the embodiment of FIG. 6A. The tantalum oxide defines a glass of higher refractive index, 1.638 versus 1.517, than the borosilicate N-BK7. The zirconium doping creates open states in the valance band. The open states provide opportunities for direction change by oscillating dipoles. Thus, the zirconium doping creates a shorter lifetime of oscillation, lower average dipole current, and lower refractive index. The effect of lower refractive index is more prominent at the higher temporal frequencies of the g and F lines. Thus, zirconium doping of the tantalum oxide creates the required negative relative partial dispersion $\Delta P_{g,F}$ of the embodiment of FIG. 6A.

The unique combination of glass types in the tube lens TL of FIG. 6A is required for a long front tube length at 1.0 to 1.5 times the effective focal length. The large Abbe number of the CAF2 at 95 indicates far less dispersion than a fluorophosphate glass, such as N-FK5 at 75 in Abbe number. The negative relative partial dispersion of the N-KZFS11 at −0.0120 is much larger in magnitude than a more common short flint such as KZFSN5 at −0.0071. Ohara offers an S-NBH5 as an equivalent to the KZFSN5. However, there are no equivalent glass types by other manufacturers to the Schott N-KZFS11. Thus, the application of the N-KZFS11 to a tube lens TL is further verified because Nikon and Olympus do not use Schott glass. Nikon and Olympus employ the glass brands of Hikari Glass Co., Ltd. (a subsidiary of Nikon Corporation of Tokyo, Japan) and Ohara respectively.

The shapes of the front singlet 10 and the back doublet 20 of the tube lens TL offer advantage during manufacture. The symmetric biconvex shape of the front singlet 10 eliminates the possibility of a backwards orientation in the assembly of the tube lens TL. The symmetric biconvex shape of the positive element 21 of the back doublet 20 permits relaxation of one surface during the manufacture of the positive element 21. A plano-convex shape of the negative element 22 of the back doublet 20 may eliminate fabrication of a spherical surface. However, the nearly plano surface 23 of the negative element 22 of the back doublet 20 is nominally a concave surface with radius at 5.0 time the effective focal length.

The CAF2 may be replaced with other materials as the long crown. Fluorophosphate glass, such as N-PK51 and N-PK52, offer similar performance to CAF2. However, the fluorophosphate glass can melt during the friction of the fabrication process.

The calcium fluoride crystal displays a much larger coefficient of thermal expansion (CTE) than most optical glass. A large difference in CTE between two cemented elements of a doublet may create problems during shipping. Cracking may occur during a shipping condition of −20 degrees C. Thus, a heater blanket might be required during shipment.

The CAF2 may be replaced with a fluorophosphate glass, such as FK5, which has a smaller CTE than CAF2. However, the larger dispersion of the FK5 glass creates a significant lateral color beyond the Airy radius at 20× magnification and 13 mm field height. The benefits of a smaller CTE may counter the correction of lateral color.

Figure 7A:
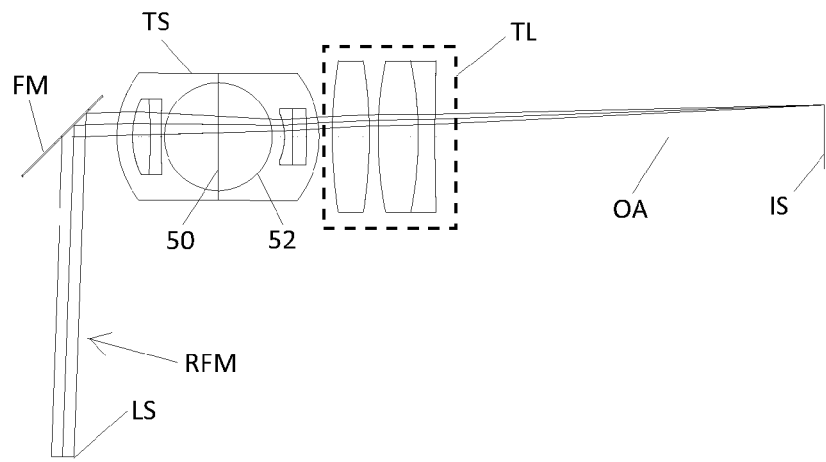
FIG. 7A is a view in side elevation of an optical system incorporating the tube lens disclosed herein with a 2× telescope.

A second optical system incorporating a tube lens TL as disclosed herein is depicted in FIG. 7A and quantified in Table 3 below. Specific elements of the telescope TS and tube lens TL are displayed in the larger view provided by FIG. 5. The optical system comprises a lens stop LS, a long front tube length, a telescope TS, a tube lens TL, and an image sensor IS. The rays to the field margin RFM indicate rays from the lens stop LS to the margin of the image sensor IS.

TABLE 3

Prescription of the tube lens with the 2× telescope

| Element | Surf | R | d | Glass | D | $n_F$ | $n_d$ | $n_C$ | $n_g$ | $V_d$ | $P_{g,F}$ | $\Delta P_{g,F}$ |
|---|---|---|---|---|---|---|---|---|---|---|---|---|
| LS | | infinity | 126.21 | | | | | | | | | |
| FM | | infinity | 27.64 | | | | | | | | | |
| 31 | front | 34.95 | 6.90 | CAF2 | 30.00 | 1.437 | 1.434 | 1.432 | 1.439 | 95.00 | 0.539 | 0.055 |
| 32 | front | −217.78 | 4.09 | N-KZFS5 | 30.00 | 1.666 | 1.654 | 1.649 | 1.675 | 39.70 | 0.571 | −0.006 |
| 32 | back | 217.78 | 48.97 | | 26.00 | | | | | | | |
| 41 | front | −23.36 | 2.96 | N-SK5 | 18.00 | 1.596 | 1.589 | 1.586 | 1.601 | 61.27 | 0.540 | −0.001 |
| 42 | front | 254.45 | 5.70 | N-SF6 | 22.00 | 1.828 | 1.805 | 1.796 | 1.847 | 25.36 | 0.616 | 0.015 |
| 42 | back | −131.01 | 10.04 | | 22.00 | | | | | | | |
| 10 | front | 188.19 | 14.70 | CAF2 | 60.00 | 1.437 | 1.434 | 1.432 | 1.439 | 95.00 | 0.539 | 0.055 |
| 10 | back | −188.19 | 8.24 | | 50.00 | | | | | | | |
| 21 | front | 148.45 | 16.00 | CAF2 | 32.00 | 1.437 | 1.434 | 1.432 | 1.439 | 95.00 | 0.539 | 0.055 |
| 22 | front | −148.45 | 6.60 | N-KZFS11 | 30.00 | 1.648 | 1.638 | 1.633 | 1.657 | 42.41 | 0.561 | −0.012 |
| 22 | back | 903.60 | 153.63 | | 30.00 | | | | | | | |
| IS | | infinity | 0.00 | | 25.03 | | | | | | | | units of distance is mm

File: TL180 3-2-T.ZMX    EFL = 359.78    FTL = 232.51    FTL/EFL = 0.65    TOTR = 426.68

Figure 3B:
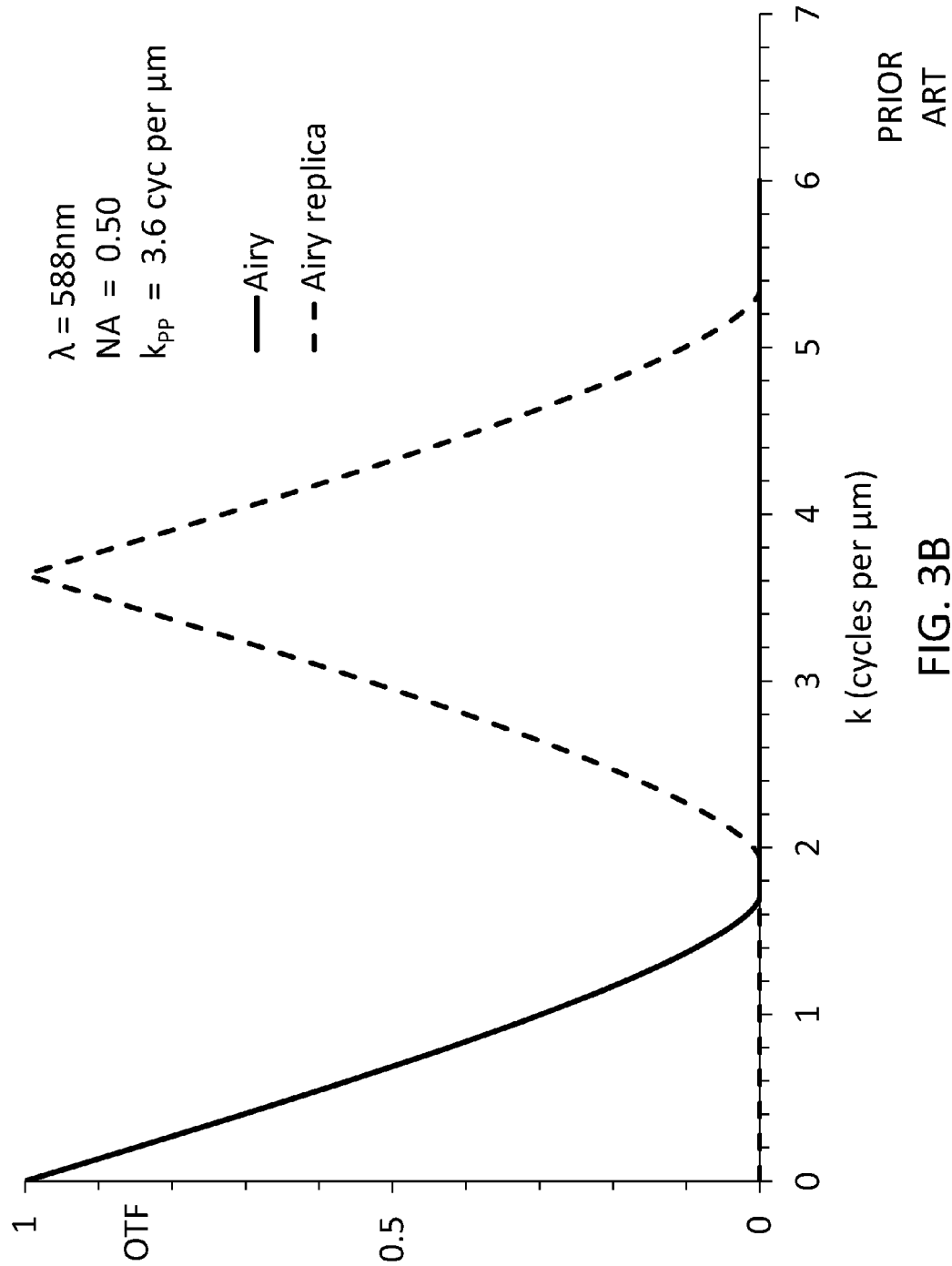
FIG. 3B is a graph of the OTF of a microscope at 40× magnification without aliasing.
Figure 4A:
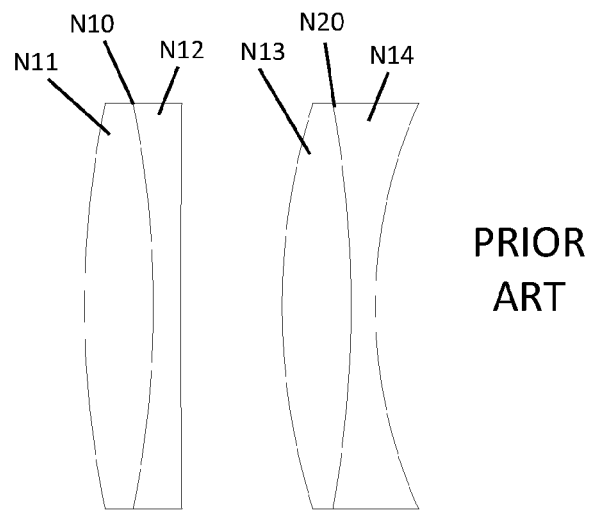
FIG. 4A is a view in side elevation of a prior art tube lens.
Figure 4B:
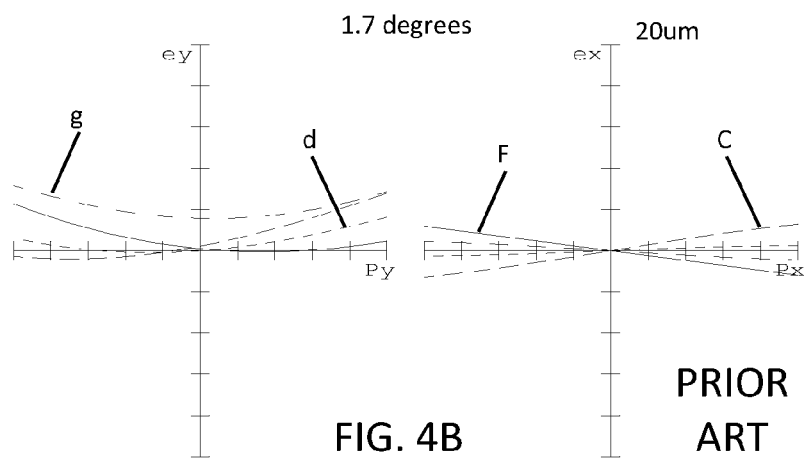
FIG. 4B is a ray intercept plot of a prior art tube lens.

The addition of the telescope TS to the tube lens TL increases the effective focal length of the tube lens TL from 180 to 360 mm. Consequently, the magnification for a 20× objective becomes 40. As previously indicated in Table 1 and FIG. 3B, the cut-off frequency at 588 nm and 0.50 NA is 1.70 cycles per µm; and the Nyquist frequency at 40× is 1.82 cycles per µm for an 11 µm Bayer pixel. Thus, the telescope TS extends the Nyquist frequency to beyond the cut-off frequency. The 2× magnification of the telescope TS eliminates the aliasing of the tube lens TL in the 20× mode.

As shown in FIG. 5, the telescope TS comprises a front doublet 30 and a back doublet 40. The front element 31 of the front doublet 30 is long crown in CAF2. The back element 32 of the front doublet 30 is short flint in N-KZFS5. The front element 41 of the back doublet 40 is a dense crown in N-SK5. The back element 42 of the back doublet 40 is a dense flint in N-SF5.

Figure 7B:
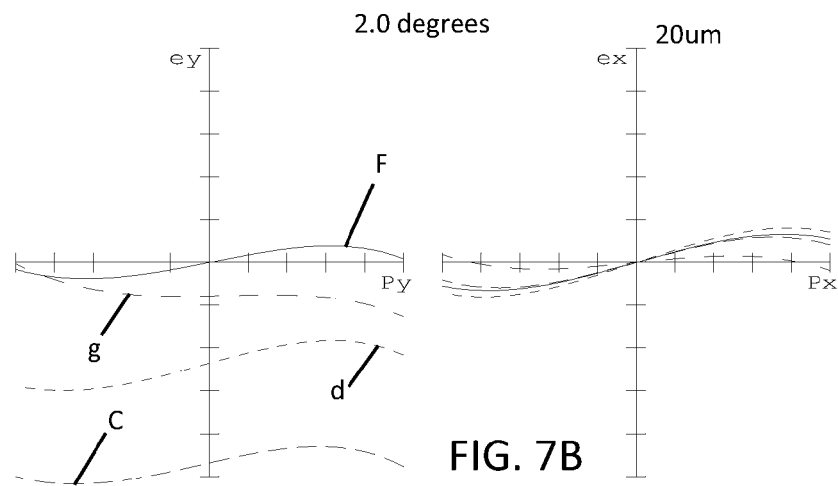
FIG. 7B is a ray intercept plot of the tube lens with the 2× telescope of FIG. 7A.

The ray intercept plot of FIG. 7B indicates lateral color coma and spherical aberration. The lateral color is circa 20.0 um, which is less than the Airy radius at 28.8 um. The small cubic features of the ey- and ex-intercepts indicate spherical aberration. The short track length of the telescope TS requires centering tolerances of 30 um between the front doublet 20 and the back doublet 30. The front doublet 20 requires a combination of long crown CAF2 and short flint N-KZFS5.

Figure 7C:
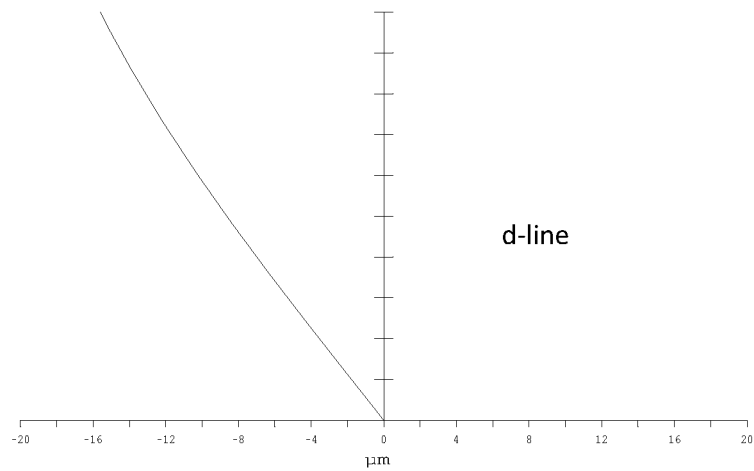
FIG. 7C is a lateral color plot of the tube lens with the 2× telescope of FIG. 7A.
Figure 7D:
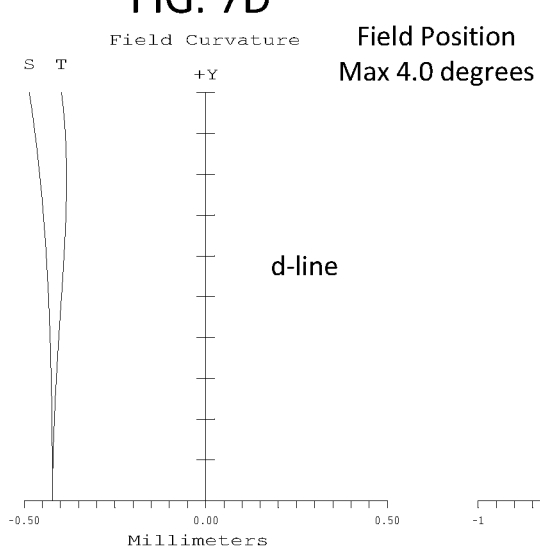
FIG. 7D is a Petzval curvature plot of the tube lens with the 2× telescope of FIG. 7A.
Figure 7E:
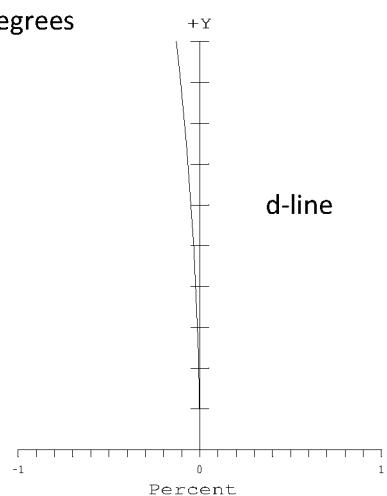
FIG. 7E is a distortion plot of the tube lens with the 2× telescope of FIG. 7A.

FIGS. 7C, 7D and 7E display the maximum lateral color, the field curvature, and the distortion of the tube lens TL of FIG. 7A. The maximum lateral color is nearly 15.6 um which is nearly half of the Airy radius at 28.8 um. The field curvature is less than 100 um. At 40× in lateral magnification, the longitudinal magnification at 1600× transforms the 60 um of Petzval curvature at the image sensor IS into less than 0.04 um at the specimen. The telescope TS practically eliminates the Petzval curvature of the embodiment of FIG. 6A. A reduction of 0.5 um of Petzval curvature at the object is highly beneficial to assembly tolerances. The distortion is 0.13%. The tube lens TL reduces field curvature and distortion at the cost of lateral color.

Figure 8A:
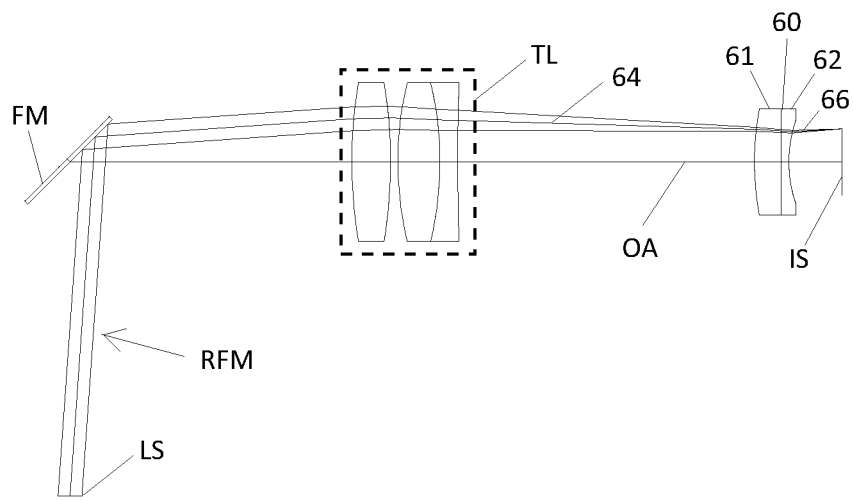
FIG. 8A is a view in side elevation of an optical system incorporating the tube lens disclosed herein with a field flattener.

In a third embodiment as depicted in FIG. 8A, the optical system with a tube lens TL accommodates a field flattener 60 in the optical system. The field flattener 60 is placed nominally near the image sensor IS. As displayed in Table 4 below, the field flattener 60 of the optical system of FIG. 8A is the doublet meniscus comprising a plano convex element 61 of dense flint and a plano concave element 62 of short flint. The dense flint of the field flattener 60 is N-SF15. The short flint of the field flattener 60 is N-KZFS5.

TABLE 4

Prescription of the tube lens with the field flattener

| Element | Surf | R | d | Glass | D | $n_F$ | $n_d$ | $n_C$ | $n_g$ | $V_d$ | $P_{g,F}$ | $\Delta P_{g,F}$ |
|---|---|---|---|---|---|---|---|---|---|---|---|---|
| LS | | infinity | 126.21 | | | | | | | | | |
| FM | | infinity | 106.30 | | | | | | | | | |
| 10 | front | 189.63 | 14.70 | CAF2 | 60.00 | 1.437 | 1.434 | 1.432 | 1.439 | 95.00 | 0.539 | 0.055 |
| 10 | back | −189.63 | 2.92 | | 60.00 | | | | | | | |
| 21 | front | 132.04 | 16.00 | CAF2 | 60.00 | 1.437 | 1.434 | 1.432 | 1.439 | 95.00 | 0.539 | 0.055 |
| 22 | front | −132.04 | 6.60 | N-KZFS11 | 60.00 | 1.648 | 1.638 | 1.633 | 1.657 | 42.41 | 0.561 | −0.012 |
| 22 | back | 925.95 | 119.07 | | 60.00 | | | | | | | |
| 61 | front | 71.77 | 10.00 | N-SF15 | 40.00 | 1.715 | 1.699 | 1.692 | 1.729 | 30.20 | 0.604 | 0.011 |
| 62 | front | infinity | 3.00 | N-KZFS5 | 40.00 | 1.666 | 1.654 | 1.649 | 1.675 | 39.70 | 0.571 | −0.006 |
| 62 | back | 39.82 | 20.00 | | 32.00 | | | | | | | |
| IS | | infinity | 0.00 | | 0.00 | | | | | | | | units of distance is mm

File: TL180 3-8-FF.zm    EFL = 179.94    FTL = 232.51    FTL/EFL = 1.29    TOTR = 424.79

Figure 8B:
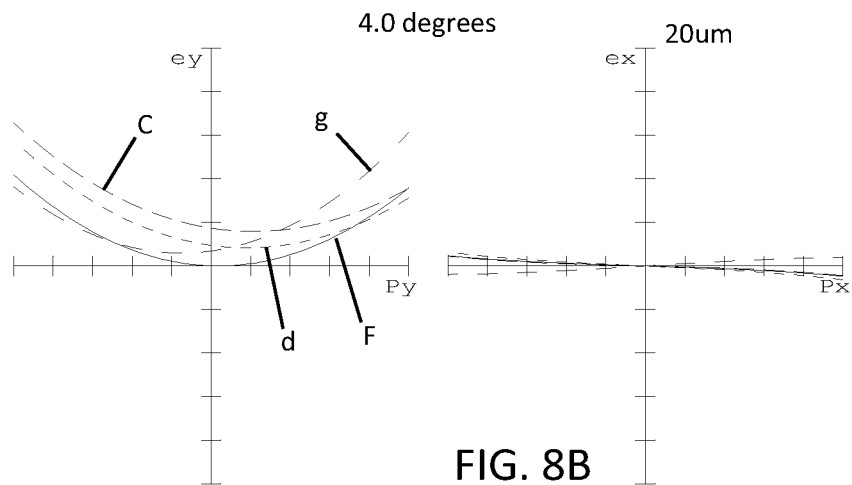
FIG. 8B is a ray intercept plot of the tube lens with the field flattener of FIG. 8A.

The ray intercept plot of FIG. 8B indicates lateral color, coma, and Petzval curvature of the third embodiment of the tube lens TL. The lateral color is less than 4.0 um, which is smaller than the lateral color of the first embodiment of the tube lens TL of FIG. 6A. The slope of the ex-intercept at the margin of the field is smaller in the present embodiment than the first embodiment. However, the embodiment of FIG. 8A displays a large coma at nearly 8 um. The embodiment of FIG. 6A has essentially no coma but there is some astigmatism. Thus, the flatter field of the present embodiment eliminates astigmatism but creates a small amount of coma.

FIGS. 8C, 8D and 8E display the maximum lateral color, the field curvature, and the distortion of the tube lens TL of FIG. 8A. The maximum lateral color of the tube lens TL is 3.2 um, which is slightly larger than the 2.6 um of the tube lens TL of FIG. 6A. The field curvature is 100 um, which is a substantial improvement from the nearly 210 um of the tube lens of FIG. 6A. At 20× in lateral magnification, the longitudinal magnification at 400× transforms the 100 um of Petzval curvature at the Image sensor IS into 0.25 um at the specimen. A reduction of 0.25 um of Petzval curvature at the object is highly beneficial to assembly tolerances. The distortion of the embodiment of FIG. 8A is 0.94%.

The shape and placement of field flattener 60 may be argued to resemble that of the positive meniscus disclosed in U.S. Pat. No. 7,808,724 to Seward. However, the field flattener 60 of the tube lens TL of FIG. 8A is not positive in optical power. The field flattener lens 60 of the tube lens TL transforms an incident chief ray 64 at inward direction to the optic axis OA into an exit chief ray 66 at outward direction from the optic axis OA. Thus, the optical power of the field flattener 60 is negative. Thus, the field flattener lens 60 of the tube lens TL of FIG. 8A is to be distinguished from the positive meniscus of Seward '724. However, if a tube lens TL has an ordinary front tube length at less than 1.0 times the effective focal length, then the positive meniscus lens of Seward '724 might become necessary for an exit chief ray CR in parallel to the optic axis OA. The combination of Petzval curvatures from an objective and a tube lens TL might also require the positive meniscus lens of Seward '724.

In a fourth embodiment which is neither claimed nor illustrated, an optical system for digital pathology comprises a Kohler illumination system, an objective lens with lens stop LS, a tube lens TL and a color CCD image sensor IS. The illumination source of the Kohler illumination system is a white LED. The optical system for digital pathology requires a specific combination of glass types, an optimum NA of the objective lens, and a sufficiently large image field. The tube lens includes a long crown and a short flint for accommodation of the white LED and a color CCD sensor. The specific glass types of the objective lens include a long crown and a short flint as essential glass types of an apochromatic or semi-apochromatic objective lens. The NA of the objective lens at 0.50 to 0.55 accommodates the excess cover strata of the tissue specimen. A sufficiently large image field at 2.0° to 4.0° accommodates a typical 20× objective lens. These conditions provide the color correction, resolution, and field size that are essential to the field of digital pathology.

A critical illumination improves the image quality of a system for digital pathology. An illumination NA at 0.75 to 0.85 times the objective NA may create a beneficial amount of lateral coherence in the form of an edge overshoot. A small edge overshoot significantly sharpens the image without creation of visible coherence effects. Thus, the NA of the illumination lens plays an important role in a system for digital pathology.

An overfilling illumination NA is defined by application of an illumination NA of 0.60. This condition requires location of an image of the source at the lens stop of the objective. The overfilling NA can promote uniform sharpness throughout the image. However, the overfilling NA creates softer edges than the underfilling NA of critical illumination. Both overfilling and underfilling NAs can greatly relax assembly tolerances. The conventional wisdom of matched NAs is difficult to align in practice.

This fourth embodiment defines an application of the first embodiment of FIG. 6A to a system for digital pathology. The nominal configuration of operational parameters includes prior art from color correction, aberration of cover strata, Kohler illumination, and critical illumination.

The location of the image conjugate of the white LED is also important. In Kohler illumination systems, the image of the source is distant from the object of illumination. However, there are numerous physical configurations that define a distant image of the source. The most obvious is infinitely distant from the object. This may be achieved by location of the image of the source at the front focal point of the condenser lens of the illumination lens.

The lens stop of the objective lens is typically not at the back focal point of the objective lens. Thus, location of image conjugate of the white LED at the lens stop of the objective does not create an infinitely distant image of source from the object. The location of image conjugate of the white LED must be carefully considered.

The CAF2 may be replaced with other materials as the long crown. Fluorophosphate glass, such as N-PK51 and N-PK52, offers similar optical properties of CAF2. However, the fluorophosphate glass can melt during the friction of the fabrication process.

A calcium fluoride crystal displays a much larger coefficient of thermal expansion (CTE) than most optical glass. There is a large difference in CTE between two cemented elements of the doublet of the tube lens: 18.9E-6 per ° C. for CAF2 and 6.6E-6 per ° C. of the N-KZFS11. The large difference in CTE can create cracks during a typical shipping condition of −20° C. Thus, a heater blanket might be required during shipment.

The CAF2 may be replaced with a fluorophosphate glass such as N-FK5. The N-FK5 is a long crown with significant differences from CAF2. The FK5 has similar CTE to N-KZFS11: 9.2E-6 per ° C. for FK5 and per ° C. 6.6E-6 for N-KZFS11. However, the N-FK5 has more dispersion as indicated by a lower Abbe number: 70 for FK5 and 95 for CAF2. The larger dispersion of the N-FK5 creates a significant lateral color beyond the Airy radius at 20× magnification and 13 mm field height. However, the benefits of a smaller CTE may counter the detriment of lateral color.

With certain details and embodiments of the present invention disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims express certain elements as means for performing a specific function, at times without the recital of structure or material. As the law demands, these claims shall be construed to cover not only the corresponding structure and material expressly described in this specification but also all equivalents thereof.

I claim as deserving the protection of Letters Patent:

1. An optical system comprising:
a lens stop;
a tube lens with an effective focal length, an optic axis, and a back focal point;
wherein a front tube length separates the lens stop and the tube lens;
wherein the front tube length is 1.0 to 1.5 times the effective focal length of the tube lens;
wherein an image field at the back focal point subtends a field angle of at least approximately 2° and at most approximately 4° with respect to the optic axis; and
wherein the tube lens comprises a front singlet of long crown and a back doublet of long crown and short flint.

2. The optical system of claim 1 wherein the long crown of the tube lens has optical properties of calcium fluoride.

3. The optical system of claim 2 wherein the short flint of the tube lens has optical properties of N-KZFS11.

4. The optical system of claim 3 wherein the front singlet is biconvex and wherein the back doublet has a front positive element that is biconvex and a back negative element that is biconcave.

5. The optical system of claim 4 wherein the front singlet has equal front and back radii of curvature and wherein the front positive element of the doublet has equal front and back radii of curvature.

6. The optical system of claim 5 wherein the radii of curvature of the front singlet are within 10% of 1.06 times the effective focal length of the tube lens, wherein the radii of curvature of front positive element of the doublet are within 10% of 0.84 times the effective focal length of the tube lens, and wherein the back doublet has a back surface with a radius of curvature within 10% of 5.0 times the effective focal length of the tube lens.

7. The optical system of claim 1 further comprising a telescope disposed in the front tube length.

8. The optical system of claim 7 wherein the telescope has a front doublet and a back doublet, wherein the front doublet of the telescope comprises a front positive element in a long crown and a back negative element in short flint, and wherein the back doublet of the telescope comprises a front negative element in a dense crown and a back positive element in a dense flint.

9. The optical system of claim 8 wherein the long crown of the telescope has optical properties of calcium fluoride.

10. The optical system of claim 9 wherein the short flint of the telescope has optical properties of N-KZFS5.

11. The optical system of claim 10 wherein the dense crown of the telescope has optical properties of N-SK5.

12. The optical system of claim 11 wherein the dense flint of the telescope has optical properties of N-SF6.

13. The optical system of claim 8 wherein the front doublet and the back doublet of the telescope have an axis, wherein the telescope has a clear aperture with an axis at normal to the axis of the front doublet and back doublet and an axis of rotation at normal to the axes of the front doublet and the clear aperture.

14. The optical system of claim 8 wherein the telescope has an angular magnification of approximately 2.

15. The optical system of claim 14 wherein the telescope has an axial length and wherein the clear aperture has a diameter more than 50% of the axial length of the telescope.

16. The optical system of claim 15 wherein the axial length of the telescope is less than 50% of the effective focal length of the tube lens.

17. The optical system of claim 1 further comprising a field flattener disposed adjacent to the back focal point of the tube lens.

18. The optical system of claim 17 wherein the field flattener comprises a doublet meniscus lens.

19. The optical system of claim 18 wherein the doublet meniscus lens of the field flattener comprises a front plano-convex element of dense crown and a back plano-concave element of short flint.

* * * * *